United States Patent
Gilbert et al.

(10) Patent No.: US 12,029,174 B2
(45) Date of Patent: Jul. 9, 2024

(54) METHOD FOR MANAGING CROP IRRIGATION, AND SYSTEM USING SAME

(71) Applicant: SemiosBio Technologies Inc., Vancouver (CA)

(72) Inventors: Michael Walter Gilbert, Vancouver (CA); Kenny Ka Hin Leung, Burnaby (CA); Tomas Teitelbaum, Vancouver (CA); Oliver Zheyi Ma, Burnaby (CA); Johann David Martinez, Davis, CA (US); Jordan Richard Hazell, Dunnville (CA); Ian Yue-Ming Chan, Burnaby (CA); Kuan Yi Liu, Richmond (CA)

(73) Assignee: SemiosBio Technologies Inc., Vancouver (CA)

( * ) Notice: Subject to any disclaimer, the term of this patent is extended or adjusted under 35 U.S.C. 154(b) by 0 days.

(21) Appl. No.: 17/547,889

(22) Filed: Dec. 10, 2021

(65) Prior Publication Data

US 2022/0183243 A1 Jun. 16, 2022

(30) Foreign Application Priority Data

Dec. 10, 2020 (CA) ................................. CA 3102341

(51) Int. Cl.
*A01G 25/16* (2006.01)
*G06Q 50/02* (2012.01)

(52) U.S. Cl.
CPC .......... *A01G 25/167* (2013.01); *G06Q 50/02* (2013.01)

(58) Field of Classification Search
CPC ...... A01G 25/167; G06Q 50/02; G06Q 10/04; G06V 20/188
See application file for complete search history.

(56) References Cited

U.S. PATENT DOCUMENTS

| | | | |
|---|---|---|---|
| 5,696,671 | A | 12/1997 | Oliver |
| 6,366,681 | B1 | 4/2002 | Hutchins |
| 6,719,488 | B2 | 4/2004 | Kuroda et al. |
| 6,850,819 | B1 | 2/2005 | Townsend |
| 7,042,234 | B2 | 5/2006 | Buss |
| 7,133,749 | B2 | 11/2006 | Goldberg et al. |
| 7,574,284 | B2 | 8/2009 | Goldberg et al. |
| 7,877,168 | B1 | 1/2011 | Porter et al. |
| 8,225,810 | B2 | 7/2012 | Blanchard |
| 8,340,910 | B1 | 12/2012 | Magro et al. |
| 8,366,017 | B1 | 2/2013 | Campbell et al. |

(Continued)

FOREIGN PATENT DOCUMENTS

| | | | | |
|---|---|---|---|---|
| CA | 3042292 | | 5/2018 | |
| CN | 104521699 A | * | 4/2015 | ........... A01G 25/162 |

(Continued)

OTHER PUBLICATIONS

Verstraeten, W.W., Veroustraete, F. and Feyen, J., 2008. Assessment of evapotranspiration and soil moisture content across different scales of observation. Sensors, 8(1), pp. 70-117. (Year: 2008).*

(Continued)

*Primary Examiner* — Alicia M. Choi
(74) *Attorney, Agent, or Firm* — KDW Firm PLLC

(57) ABSTRACT

Described are various embodiments of a method for managing crop irrigation, and system using same.

20 Claims, 16 Drawing Sheets

(56) References Cited

U.S. PATENT DOCUMENTS

| | | |
|---|---|---|
| 8,548,632 B1 | 10/2013 | Porter et al. |
| 8,751,052 B1 | 6/2014 | Campbell et al. |
| 8,862,277 B1 | 10/2014 | Campbell et al. |
| 9,107,354 B2 | 8/2015 | Martin et al. |
| 9,569,803 B1 | 2/2017 | France et al. |
| 9,775,308 B2 | 10/2017 | Schmidt et al. |
| 9,894,849 B2 | 2/2018 | Rooney et al. |
| 10,115,158 B2 | 10/2018 | Lindores |
| 10,241,488 B2 | 3/2019 | Rodriguez et al. |
| 10,327,397 B2 | 6/2019 | Olive-Chahinian et al. |
| 10,362,739 B2 | 7/2019 | Ersavas et al. |
| 10,368,506 B2 | 8/2019 | Neesen et al. |
| 10,412,907 B2 | 9/2019 | Sharif et al. |
| 10,420,295 B2 | 9/2019 | Marsters et al. |
| 10,426,106 B2 | 10/2019 | Madgavkar et al. |
| 10,499,572 B2 | 12/2019 | Charling et al. |
| 10,509,378 B2 | 12/2019 | Jennings et al. |
| 10,512,226 B2 | 12/2019 | Lankford |
| 10,524,430 B1 | 1/2020 | Nervino et al. |
| 10,542,684 B2 | 1/2020 | Pearson et al. |
| 10,561,081 B2 | 2/2020 | Ozawa et al. |
| 10,602,682 B1 | 3/2020 | Wardle et al. |
| 10,624,280 B2 | 4/2020 | Eyring et al. |
| 10,628,895 B2 | 4/2020 | Xu et al. |
| 10,631,474 B2 | 4/2020 | Guy et al. |
| 10,716,269 B2 | 7/2020 | Ersavas et al. |
| 10,721,880 B2 | 7/2020 | Guy et al. |
| 10,743,482 B2 | 8/2020 | Standerfer et al. |
| 2006/0074560 A1* | 4/2006 | Dyer .................. G06Q 10/04 702/5 |
| 2015/0370935 A1* | 12/2015 | Starr .................. G06Q 50/02 703/11 |
| 2017/0061052 A1* | 3/2017 | Gates .................. G06N 5/04 |
| 2018/0059691 A1* | 3/2018 | Fleming .............. G06Q 50/02 |
| 2018/0164762 A1* | 6/2018 | Mewes ................ G05B 19/042 |
| 2019/0050948 A1* | 2/2019 | Perry .................. G06Q 10/04 |
| 2019/0230875 A1* | 8/2019 | Mewes ................ A01B 79/005 |
| 2020/0107487 A1* | 4/2020 | Antich ................ A01C 7/203 |
| 2020/0151376 A1* | 5/2020 | Gates .................. G06F 30/20 |
| 2020/0214231 A1* | 7/2020 | Beeri .................. G05B 19/042 |
| 2020/0214232 A1* | 7/2020 | Wardle ................ G05D 7/0623 |
| 2020/0241579 A1* | 7/2020 | Ben-Ner .............. C10M 141/06 |
| 2020/0296906 A1* | 9/2020 | Sun .................... A01G 25/167 |

FOREIGN PATENT DOCUMENTS

| | | |
|---|---|---|
| WO | WO 2012/142050 A1 | 10/2012 |
| WO | WO 2019/033158 A1 | 2/2019 |
| WO | WO 2020/047587 A1 | 3/2020 |

OTHER PUBLICATIONS

International Search Report and Written Opinion of the International Searching Authority Corresponding to International Application No. PCT/US 2021/062811 dated Mar. 31, 2022.

Notice of Publication corresponding to International Application No. PCT/US2021/062811 dated Jun. 16, 2022.

* cited by examiner

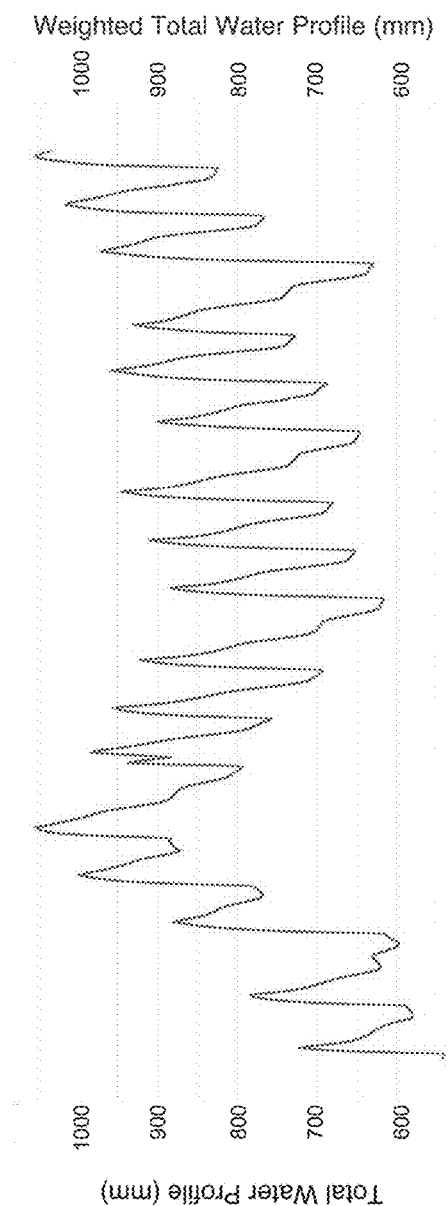
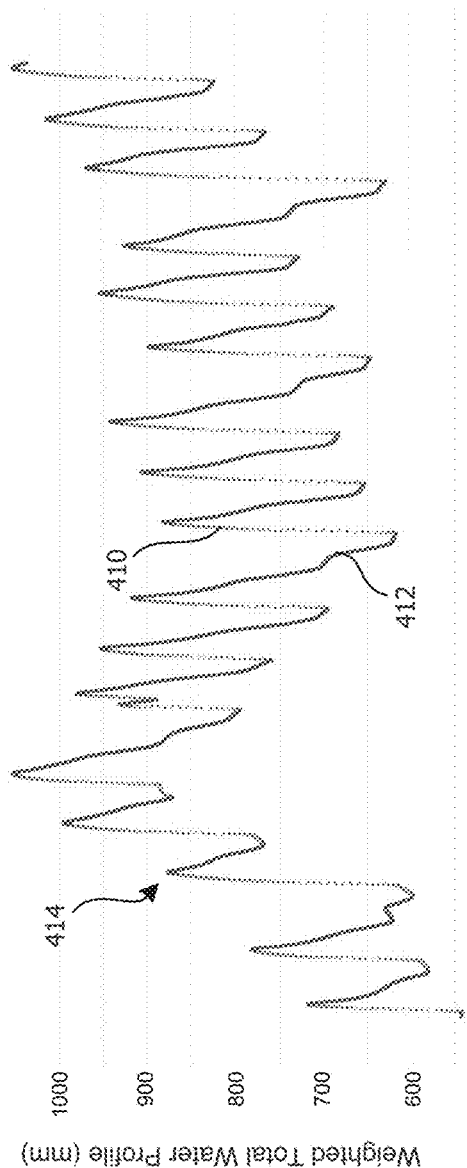
Figure 4A
Figure 4B

| Month | Days | Control | Treatment 1 | Treatment 2 | Treatment 3 | Treatment 4 | Treatment 5 | Treatment 6 | Treatment 7 | Treatment 8 |
|---|---|---|---|---|---|---|---|---|---|---|
| March | 1-15 | 80% | 80% | 80% | 65% | 50% | 80% | 80% | 80% | 80% |
| March | 16-31 | 80% | 80% | 80% | 65% | 50% | 80% | 80% | 80% | 80% |
| April | 1-15 | 80% | 80% | 80% | 65% | 50% | 80% | 80% | 80% | 80% |
| April | 16-30 | 80% | 80% | 80% | 65% | 50% | 80% | 80% | 80% | 80% |
| May | 1-15 | 80% | 65% | 50% | 80% | 80% | 80% | 80% | 80% | 80% |
| May | 16-31 | 80% | 65% | 50% | 80% | 80% | 80% | 80% | 80% | 80% |
| June | 1-15 | 80% | 65% | 50% | 80% | 80% | 80% | 80% | 80% | 80% |
| June | 16-30 | 80% | 80% | 80% | 80% | 80% | 80% | 80% | 80% | 80% |
| July | 1-15 | 80% | 80% | 80% | 80% | 80% | 65% | 50% | 80% | 80% |
| July | 16-31 | 80% | 80% | 80% | 80% | 80% | 65% | 50% | 80% | 80% |
| August | 1-15 | 80% | 80% | 80% | 80% | 80% | 65% | 50% | 80% | 80% |
| August | 16-31 | 80% | 80% | 80% | 80% | 80% | 80% | 80% | 65% | 50% |
| September | 1-15 | 80% | 80% | 80% | 80% | 80% | 80% | 80% | 65% | 50% |
| September | 16-30 | 80% | 80% | 80% | 80% | 80% | 80% | 80% | 65% | 50% |
| October | 1-15 | 80% | 80% | 80% | 80% | 80% | 80% | 80% | 65% | 50% |
| October | 16-31 | 80% | 80% | 80% | 80% | 80% | 80% | 80% | 80% | 80% |
| November | 1-15 | 80% | 80% | 80% | 80% | 80% | 80% | 80% | 80% | 80% |
| Yield (lbs per acre) | | 4000 | 3850 | 3600 | 4000 | 3900 | 3100 | 2800 | 3400 | 3300 |

Figure 19

METHOD FOR MANAGING CROP IRRIGATION, AND SYSTEM USING SAME

CROSS-REFERENCE TO RELATED APPLICATION

This patent application claims priority to Canadian Patent Application No. 3102341, filed Dec. 10, 2020, the disclosure of which is incorporated herein by reference in its entirety.

FIELD OF THE DISCLOSURE

The present disclosure relates to agricultural practices, and, in particular, to a method for managing crop irrigation, and a system using same.

BACKGROUND

Various crop management models exist for prescribing irrigation applications based on various soil properties in order to, for instance, preserve materials or to improve crop yields.

For instance, U.S. Pat. No. 10,512,226 entitled "Crop-Specific Automated Irrigation and Nutrient Management", published Dec. 24, 2019 to Lankford, discloses an automated system for scheduling irrigation to different regions of a property based on how deviant a soil moisture level in each region is relative to what is expected for that soil type.

Similarly, U.S. Pat. No. 10,602,682 entitled "Irrigation Controller and Associated Methods", published Mar. 31, 2020 to Wardle, et al., discloses a system and method related to the scheduling and implementation of watering periods based on expected amounts evapotranspiration and precipitation.

With respect to the fertigation of crops, U.S. Pat. No. 10,561,081 entitled "Fertigation system, fertigation control server, salts accumulation determination method, and soil EC sensor", published Feb. 18, 2020 to Ozawa, et al., discloses a fertigation system and associated conductivity sensor for selectively applying a fertigation solution to different crop areas based on sensed soil conductivity.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a method for managing crop irrigation, and system using same, that overcomes some of the drawbacks of known techniques, or at least, provides a useful alternative thereto. Some aspects of this disclosure provide examples of such systems and methods.

In accordance with one aspect, there is provided a location-specific irrigation management system for predicting crop-realizable water in a crop location, the location-specific irrigation management system comprising: a network-interfacing sensor configured to acquire a soil moisture value at the crop location associated with the network-interfacing sensor; a network communications device configured to receive, over a network and in relation to the crop location, the soil moisture value and an irrigation signal indicative of an irrigation event; a digital data storage component for storing the soil moisture value and the irrigation signal over time and in association with the crop location; and a digital data processor operable to calculate, at least in part based on the stored soil moisture values and the stored irrigation signals, a location-specific crop-realizable water characteristic for predicting a future crop-realizable water value at the crop location.

In one embodiment, the future crop-realizable water value at the crop location predicted by the location-specific crop-realizable water characteristic is further based on one or more water application events at the crop location.

In one embodiment, the digital data processor is operable to access a minimum available crop-realizable water value associated with the crop location.

In one embodiment, the digital data storage component is further configured to store environmental data and wherein the location-specific crop-realizable water characteristic calculation, at least in part, is further based on the environmental data.

In one embodiment, the environmental data is automatically acquired by at least one of: a precipitation sensor, a hygrometer, the network-interfacing sensor, a temperature sensor, a humidity sensor, a pressure sensor, a weather station, or a third-party data source.

In one embodiment, the system further comprises an irrigation application sensor associated with the crop location and configured to automatically acquire the irrigation signal indicative of an irrigation event.

In one embodiment, the location-specific crop-realizable water characteristic comprises a location-specific crop-realizable water growth characteristic for predicting an increase in future crop-realizable water values resulting from irrigation events.

In one embodiment, the location-specific crop-realizable water characteristic comprises a location-specific crop-realizable water decay characteristic for predicting a decrease in future crop-realizable water values between irrigation events.

In one embodiment, the digital data processor is further operable to calculate, at least in part based on the location-specific crop-realizable water characteristic, a location-specific irrigation application value so to provide a preferred crop application at the crop location to achieve a preferred future crop-realizable water value at the crop location.

In one embodiment, the digital data processor is further operable to calculate, at least in part based on the location-specific crop-realizable water characteristic, the location-specific irrigation application value so to provide the preferred crop application at the crop location to achieve the preferred future crop-realizable water value at the crop location accounting for one or more watering events.

In one embodiment, the preferred future crop-realizable water value is related to a threshold value or a target range of the future crop-realizable water value.

In one embodiment, the location-specific irrigation application value is calculated to provide the preferred future crop-realizable water value at the crop location for a designated duration of time.

In one embodiment, the digital data storage component is further configured to store crop outcome data in association with the crop location.

In one embodiment, at least some of the crop outcome data comprises observational crop data.

In one embodiment, at least some of the observational crop data comprises at least one of pre-harvest crop data and post-harvest crop data.

In one embodiment, the crop outcome data relates to one or more of a crop yield, a crop grade, or a crop damage.

In one embodiment, at least some of the crop outcome data comprises sensed crop data.

In one embodiment, at least some the crop outcome data is related to a crop value.

In one embodiment, the location-specific irrigation application value is calculated, at least in part, based on the crop outcome data.

In one embodiment, the digital data processor is further operable to access third-party crop data, and wherein the location-specific irrigation application value is calculated, at least in part, based on the third-party data.

In one embodiment, the digital data processor is further operable to recalculate the location-specific crop-realizable water characteristic upon receipt of new data related thereto.

In one embodiment, the digital data processor is further configured to output an irrigation control signal corresponding to the location-specific irrigation application value.

In one embodiment, the system further comprises one or more irrigation deployment devices configured to apply a location-specific irrigation application in accordance with the location-specific irrigation application value in response to the irrigation control signal output from the digital data processor.

In one embodiment, the irrigation deployment device comprises one or more of a material distribution conduit, a distributed material reservoir, a vehicle-based material distributor, a drone, or a combination thereof.

In one embodiment, the network-interfacing sensor is configured to continuously acquire and communicate the soil moisture value.

In one embodiment, the network-interfacing sensor is configured to acquire and communicate the soil moisture value according to a designated sensing schedule.

In one embodiment, the crop location comprises the location of one or more of a farm, a field, a crop area, a portion of a field, a block, a portion of a block, a row of plants, a portion of a row of plants, a group of plants, or a plant.

In accordance with another aspect, there is provided a location-specific irrigation management method for predicting plant-realizable water in a crop location, the location-specific irrigation management method comprising: acquiring a soil moisture value by a network-interfacing sensor at the crop location, the soil moisture value being indicative of a plant-realizable water value at the crop location; receiving at a network communications device the soil moisture value and an irrigation signal indicative of an irrigation event at the crop location; storing, over time and in association with the crop location, the soil moisture value and the irrigation signal; determining, at a digital data processor, for the crop location, at least in part based on the stored moisture value and the irrigation signal, a location-specific plant-realizable water characteristic for predicting a future plant-realizable water value at the crop location.

In one embodiment, the future plant-realizable water value at the crop location predicted by the location-specific realizable water characteristic is further based on one or more irrigation events at the crop location.

In one embodiment, the digital data processor is operable to access a minimum available plant-realizable water value associated with the crop location.

In one embodiment, the digital data storage component is further configured to store environmental data, and wherein the determining a location-specific plant-realizable water characteristic is at least in part further based on the environmental data.

In one embodiment, the determining a location-specific plant-realizable water characteristic comprises calculating a location-specific realizable water growth characteristic for predicting an increase in future plant-realizable water values resulting from irrigation events.

In one embodiment, the determining a location-specific plant-realizable water characteristic comprises calculating a location-specific realizable water decay characteristic for predicting a decrease in future plant-realizable water values between irrigation events.

In one embodiment, the method further comprises calculating, using the digital data processor and at least in part based on the location-specific realizable water characteristic, a location-specific irrigation application value so to provide a preferred crop application at the crop location to achieve a preferred future plant-realizable water value at the crop location.

In one embodiment, the method further comprises calculating, at least in part based on the location-specific plant-realizable water characteristic, the location-specific irrigation application value so to provide the preferred crop application value at the crop location to achieve the future plant-realizable water value at the crop location accounting for one or more watering events.

In one embodiment, the preferred future plant-realizable water value is related to a threshold value or a target range of the future plant-realizable water value.

In one embodiment, the location-specific irrigation application value is calculated to provide the preferred future plant-realizable water value at the crop location for a designated duration of time.

In one embodiment, the digital data storage component is further configured to store crop outcome data in association with at least some of the crop location.

In one embodiment, at least some of the crop outcome data comprises observational crop data.

In one embodiment, at least some of the observational crop data comprises at least one of pre-harvest crop data and post-harvest crop data.

In one embodiment, the crop outcome data relates to one or more of a crop yield, a crop grade, or a crop damage.

In one embodiment, at least some of the crop outcome data comprises sensed crop data.

In one embodiment, at least some of the crop outcome data is related to a crop value.

In one embodiment, the location-specific irrigation application value is calculated, at least in part, based on the crop outcome data.

In one embodiment, the digital data processor is further operable to access third-party crop data, and wherein the location-specific irrigation application value is calculated, at least in part, based on the third-party data.

In one embodiment, the digital data processor is further operable to recalculate the location-specific plant-realizable water characteristic upon receipt of new data related thereto.

In one embodiment, the method further comprises outputting an irrigation control signal corresponding to the location-specific irrigation application.

In one embodiment, the method further comprises applying, from one or more irrigation deployment devices, the location-specific irrigation application in response to the control signal output from the digital data processor.

In one embodiment, the one or more irrigation deployment devices comprise one or more of a material distribution conduit, a distributed material reservoir, a vehicle-based material distributor, a drone, or a combination thereof.

In one embodiment, the network-interfacing sensor is configured to continuously acquire and communicate the soil moisture value.

In one embodiment, the network-interfacing sensor is configured to acquire and communicate the soil moisture value in accordance with a designated sensing schedule.

In one embodiment, the crop location comprises the location of one or more of a farm, a field, a crop area, a portion of a field, a block, a portion of a block, a row of plants, a portion of a row of plants, a group of plants, or a plant.

In accordance with another aspect, there is provided a location-specific irrigation management system for managing a crop irrigation system, the location-specific irrigation management system comprising: a plurality of network-interfacing sensors each configured to acquire a soil moisture value at a respective crop location associated with a respective one or more of the plurality of network-interfacing sensors, the soil moisture value being indicative of a plant-realizable water value at the respective crop location; a network communications device configured to receive the soil moisture values associated with the respective crop locations over a network; a digital data storage component for storing, over time and in association with each of the respective crop locations, the soil moisture values, a plant-realizable water target profile, and a location-specific plant-realizable water characteristic relating the acquired soil moisture value and a plant-realizable water value; and a digital data processor in network communication with the digital data storage component and operable to calculate, for at least one of the respective crop locations and at least in part based on the acquired moisture values, the stored plant-realizable water target profile, and the location-specific plant-realizable water characteristic associated with the respective crop locations, a location-specific irrigation application so to maintain the plant-realizable water value in accordance with the plant-realizable water target profile at the at least one of the respective crop locations.

In one embodiment, the digital data processor is further operable to access crop outcome data associated with at least one of the respective crop locations, and is further operable to calculate a correlation between the crop outcome data and the stored soil moisture values for the at least one of the respective crop locations.

In one embodiment, at least some of the crop outcome data comprises observational crop data.

In one embodiment, at least some of the observational crop data comprises at least one of pre-harvest crop data and post-harvest crop data.

In one embodiment, the crop outcome data relates to one or more of a crop yield, a crop grade, or a crop damage.

In one embodiment, at least some of the crop outcome data comprises sensed crop data.

In one embodiment, at least some the crop outcome data is related to a crop value.

In one embodiment, the location-specific irrigation application is calculated, at least in part, based on the crop outcome data.

In one embodiment, the digital data processor is further operable to modify the plant-realizable water target profile for at least one of the respective crop locations based on the correlation.

In one embodiment, the network communications device is further configured to send irrigation control signals for controlling water application by one or more irrigation deployment devices so to maintain the plant-realizable water value in accordance with the plant-realizable water target profile in at least one of the respective crop locations.

In one embodiment, the plant-realizable water target profile at each respective crop location comprises: a minimum plant-realizable water value threshold, a maximum plant-realizable water value, or both.

In one embodiment, the plant-realizable water target profile comprises a variable water target value over the duration of a growing season.

In one embodiment, the respective crop locations comprise respective locations of one or more of a farm, a field, a crop area, a portion of a field, a block, a portion of a block, a row of plants, a portion of a row of plants, a group of plants, or a plant.

In one embodiment, the respective crop locations comprise crop locations from different farms.

In one embodiment, the location-specific plant-realizable water characteristic comprises a location-specific plant-realizable water growth characteristic for predicting an increase in future plant-realizable water values resulting from irrigation events.

In one embodiment, the location-specific plant-realizable water characteristic comprises a location-specific plant-realizable water decay characteristic for predicting a decrease in future plant-realizable water values between irrigation events.

In accordance with another aspect, there is provided a location-specific irrigation management method for managing a crop irrigation system, the method comprising: acquiring a soil moisture value via a respective network-interfacing sensor at a respective crop location associated therewith, the soil moisture value being indicative of a plant-realizable water value at the crop location; receiving at a network communications device the soil moisture value associated with the respective crop location over a network; storing, over time and in association with the respective crop location, the soil moisture value; accessing, via a networked digital data processor, a plant-realizable water target profile and a location-specific plant-realizable water characteristic relating the soil moisture value and the plant-realizable water value, the plant-realizable water target profile and the location-specific plant-realizable water characteristic being associated with the respective crop location; and calculating, at least in part based on the acquired soil moisture value, the stored plant-realizable water target profile, and the location-specific plant-realizable water characteristic, a location-specific irrigation application to maintain the plant-realizable water value in accordance with the plant-realizable water target profile at the respective crop location.

In one embodiment, the method further comprises accessing, via the networked digital data processor, crop outcome data associated with the respective crop location; and calculating, via the networked digital data processor, a correlation between the crop outcome data and the stored soil moisture values for the respective crop location.

In one embodiment, the method further comprises modifying the plant-realizable water target profile for the respective crop location based on the correlation.

In one embodiment, the method further comprises sending an irrigation control signal to one or more irrigation deployment devices so to apply therefrom the location-specific irrigation application and thereby maintain the plant-realizable water value in accordance with the plant-realizable water target profile.

In one embodiment, the plant-realizable water target profile at the respective crop location comprises: a minimum plant-realizable water value threshold, a maximum plant-realizable water value, or both.

In one embodiment, the plant-realizable water target profile comprises a variable water target value over the duration of a growing season.

In accordance with another aspect, there is provided a location-specific irrigation management method for managing a crop irrigation system, the method comprising: acquiring respective crop requirement metrics via respective sensors of a plurality of network-interfacing sensors, each respective sensor being associated with a respective crop location, the respective crop requirement metrics being indicative of respective soil characteristic values at each crop location; receiving at a network communications device the crop requirement metrics associated with the respective crop locations over a network; storing, over time and in association with the respective crop locations, the respective crop requirement metrics; accessing, via a networked digital data processor, respective crop requirement target profiles and respective location-specific crop requirement coefficients relating the respective crop requirement metrics and the respective soil characteristic values, the respective location-specific crop requirement coefficients and the respective location-specific crop requirement coefficients being associated with respective crop locations; and via the networked digital data processor, calculating, for at least one of the respective crop locations and at least in part based on the respective sensed crop requirement metrics, the respective stored crop requirement target profiles, and the respective location-specific crop requirement coefficients, respective location-specific irrigation applications to maintain the respective soil characteristic values in accordance with the respective crop requirement target profiles at the at least one of the respective crop locations.

In one embodiment, the method further comprises accessing, via the networked digital data processor, respective crop outcome data associated with the respective crop locations; and calculating, via the networked digital data processor, a correlation between the respective crop outcome data and the stored respective crop requirement metrics for the respective crop locations.

In one embodiment, the method further comprises modifying the respective crop requirement target profiles for the respective crop locations based on the correlation.

In one embodiment, the respective crop locations comprise the locations of one or more of a farm, a field, a crop area, a portion of a field, a block, a portion of a block, a row of plants, a portion of a row of plants, a group of plants, or a plant.

In one embodiment, the method further comprises outputting, via the networked digital data processor, an irrigation control signal corresponding to the respective location-specific irrigation applications.

In one embodiment, the method further comprises applying, from one or more irrigation deployment devices, the respective location-specific irrigation applications in response to the irrigation control signal.

In one embodiment, the one or more irrigation deployment devices comprise one or more of a material distribution conduit, a distributed material reservoir, a vehicle-based material distributor, a drone, or a combination thereof.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIGS. 4A and 4B are exemplary plots illustrating soil water profiles, in accordance with various embodiments;

FIG. 19 is a table showing exemplary crop data related to crop yields at different crop locations subjected to different irrigation practices over the course of a growing season, in accordance with various embodiments.

Figure 1:
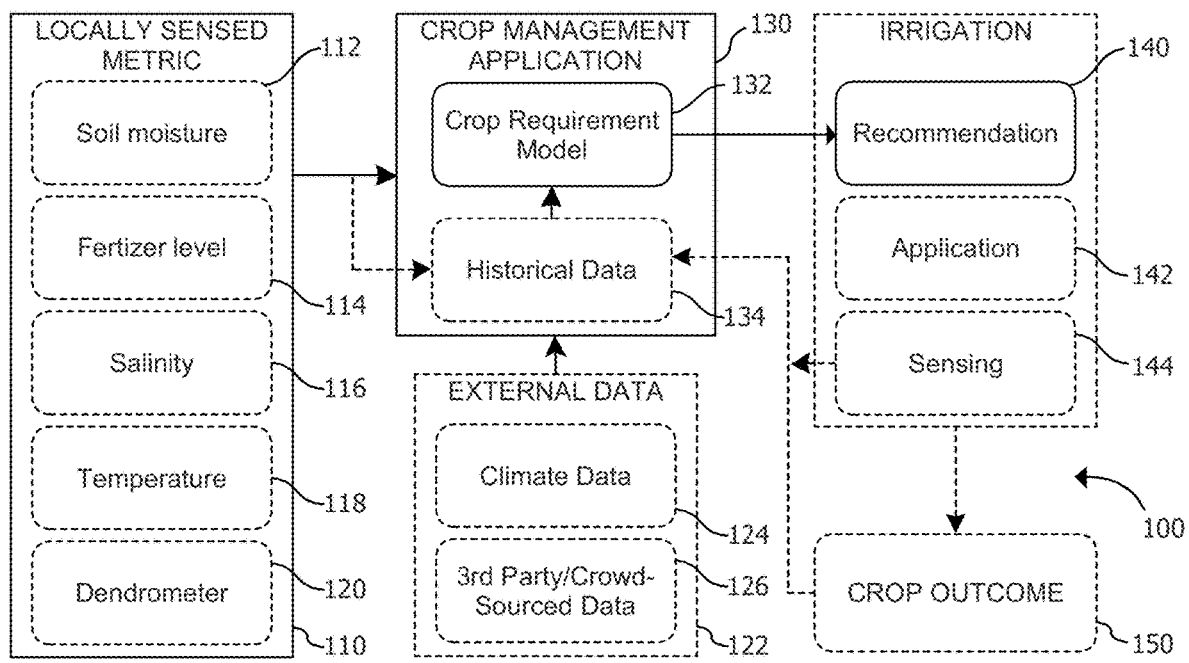
FIG. 1 is a schematic diagram of an exemplary process implementable by a crop management platform for providing crop location-specific recommendations related to growing practices, in accordance with various embodiments.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Unless defined otherwise, all technical and scientific terms used herein have the same meaning as commonly understood by one of ordinary skill in the art to which this invention belongs.

Throughout the specification and claims, the following terms take the meanings explicitly associated herein, unless the context clearly dictates otherwise. The phrase "in one of the embodiments" or "in at least one of the various embodiments" as used herein does not necessarily refer to the same embodiment, though it may. Furthermore, the phrase "in another embodiment" or "in some embodiments" as used herein does not necessarily refer to a different embodiment, although it may. Thus, as described below, various embodiments may be readily combined, without departing from the scope or spirit of the innovations disclosed herein.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term "comprising", as used herein, will be understood to mean that the list following is non-exhaustive and may or may not include any other additional suitable items, for example one or more further feature(s), components) and/or element(s) as appropriate.

The term "crop", as used herein, will be understood to mean any one or more plants or organisms that may be harvested. A crop may, for instance, be aesthetic in nature, or may be one that is grown for personal consumption, or harvested for commercial sale. A crop may comprise a single organism (e.g. a bush, a tree, a plant, a vine, a mushroom, or the like), a group of organisms (a row of crops in a farm field, a cluster of trees, or the like), a crop plot, a farm, or the like. Accordingly, a "crop location" may refer to a highly specific location, such as that corresponding to a particular plant, or portion thereof (e.g. a South-facing bough of a tree, a grouping thereof, a particular vine in a row of vines, a tree canopy, or the like). A crop location may alternatively, or additionally, correspond to a row of crops, a field, a particular acreage of a farm, a crop within a particular area, geographic location, or feature (e.g. a flat plot of land, a slope, such as a South-facing slope, a valley, a ravine, a mesa, a hillside, a plot of land characterized by a particular nutrient or requirement level, such as a riverside plot, or the like), or, a crop location may refer to larger swaths of land, such as a farm, a cluster thereof, a region sharing a common aquifer, or the like. Further, a crop may refer to a single species of organism (e.g. a carrot, a Brazil nut tree, a particular species of grape or barley, or the like), or may comprise or encompass more than one crop species.

The term "crop requirement", as used herein, will be understood to mean a material that is utilized in the growing, managing, maintaining, treating, or the like, of a plant or crop. A crop requirement may be naturally occurring, and/or may be applied to the crop, either manually or automatically. Examples of a crop requirement may include, but are not limited to, water, a fertilizer, a pesticide, a chemical, a salt, an alkaline or basic material, an herbicide, a fungicide, sunlight, radiation, heat, or the like.

The term "crop requirement metric", as used herein, will be understood to mean any measure that may correspond to a crop requirement. For instance, and without limitation, a crop requirement metric may refer to a soil moisture level, a pH a level of pesticide, herbicide, fungicide, or the like, a temperature, a measure of radiation or sunlight in a crop location, a plant stress, a dendrometer measurement, or the like. In accordance with some embodiments, a crop requirement may directly reflect a "crop requirement characteristic" of a crop or crop location (e.g. a soil moisture level, a fertilizer level, or the like), or may be associated with (e.g. used to infer) a crop requirement characteristic, non-limiting examples of which may include a metric of water availability for a crop, a crop's water usage capacity, a maximum allowable depletion, or the like. Further, a crop requirement metric or characteristic may refer to a change, or rate of change, in a previously observed metric (e.g. how a crop's water usage capacity varies over time, for instance following a designated application of water).

Acquisition of a crop requirement metric or crop requirement characteristic may be performed by, for instance, one or more sensors, non-limiting examples of which may include, but are not limited to, soil moisture sensors, dendrometers, hygrometers, thermometers, pH meters, salinity meters, adsorption or absorption-based sensors, irradiation meters, chemical sensors, wind speed sensors, precipitation sensors, or the like. Further, a sensor may acquire data related to the application of a crop requirement or crop material. For example, a sensor may comprise a flow meter, pressure transducer, or the like, operable to measure a flow rate or volume of water or fertilizer applied to a crop location in real time, or before/after an application. Sensor acquisition may be instantaneous in nature (e.g. the current temperature, soil moisture, or fertilizer level of a crop, etc.), or may be time-dependent (e.g. integrated over every ten minutes or other designated time frame, etc.). Further, a crop requirement metric may be continuously acquired (e.g. a real-time or near-real-time measurement), acquired periodically (e.g. twice daily, one a week, monthly, at the start of a growing season, etc.), or acquired as a function of, for instance, a previously observed metric (e.g. once per minute during irrigation, hourly during humid days, every ten days when soil moisture levels are high, more frequently when near a crop requirement threshold, etc.). In some embodiments, a sensor may comprise a soil moisture sensor operable to detect a height or depth of water in a soil, or a water profile height (e.g. 1500 mm of soil that is saturated with water).

In accordance with various embodiments, a location-specific sensor may comprise one that is associated with a crop location. A sensor may be associated with a specific plant, or portion thereof, or may represent a larger scale of crop (e.g. representative of many or all crop locations on a farm). Further, a location-specific sensor may correspond not to a particular plant, but to a crop area, or crop plot, in general. For instance, a soil moisture sensor embedded in soil near a plant may report measurement of a soil moisture or amount of water available to a specific plant; or, in some embodiments, its measurement may represent a more global parameter for nearby crops, or more generally to a plot of soil. For instance, a wind sensor or thermometer on a hillside situated South of a farm may be associated with the Southern crop rows of the farm. In some embodiments, the location-specific association with a sensor may refer to a very specific location (i.e. a part of a particular plant, including: above, in, or below canopy; above, in, or below root mass; or any other portion of a plant); it may refer to a single or a group of plants, including a row or block of plants; or it may refer more broadly to the area surrounding the sensor.

In some embodiments, a sensor may be network-interfacing, or otherwise operable to communicate in a wired or wireless fashion with other sensors, or to a digital application, such as an irrigation management platform. In some embodiments, a sensor may be directly or indirectly coupled with an irrigation platform so to trigger irrigation of a crop upon, for instance, registering a designated level of measurement. Further, a sensor may comprise a network of sensors that independently or collectively contribute to providing a crop requirement or a plurality thereof. In accordance with some embodiments, irrigation applications may further be monitored for communication of data related thereto over a network for reporting. For instance, a pressure transducer associated with an irrigation deployment device may report over a network on a rate or volume of water applied to a crop location. Alternatively, or additionally, irrigation signals related to a volume, height, rate, and/or timing of irrigation events may be received by an irrigation management platform from pressure transducers associated with irrigation deployment devices, from a user interface (UI), such as one associated with a networked device (e.g. smartphone, personal computer, or the like), or directly from an irrigation control box. Further, various embodiments relate to communication to an irrigation management platform of various other irrigation-related metrics, such as an amount of sensed or measured precipitation at, near, or otherwise related to a crop location. Accordingly, and in accordance with some embodiments, an irrigation event may comprise a water application via, for instance, an automatic or manual irrigation system (i.e. an irrigation application), and/or a precipitation event.

The term "irrigation", as used herein, will be understood to refer to the application of a crop requirement to a crop. As such, while examples of irrigation systems as described herein may refer to systems for applying water to a crop, an irrigation system may alternatively, or additionally, refer to a system for applying fertilizer, one or more chemicals, or the like, to a crop. For instance, and in accordance with various embodiments, the systems and methods herein disclosed may refer to a fertigation system. Further, an irrigation system, in accordance with various embodiments, may comprise one that is configured to release a crop requirement from a material distribution conduit, such as an irrigation or fertigation system known in the art, a distributed material reservoir, a vehicle-based material distributor, a drone, or a combination thereof. Further, an irrigation system may refer to, for instance, a farmer manually applying a crop requirement to a crop in accordance with one or more of the various systems and/or methods herein described. An irrigation system may be manually engaged for material distribution, or may be, for instance, automatically activated upon receipt (or upon a prescribed delay after receipt) of a corresponding signal via wired or wireless transmission from an irrigation management application.

The term "application", with reference to a crop requirement, and as used herein, will be understood to refer to the addition, or in some embodiments a subtraction, of a crop requirement or crop material (e.g. water, fertilizer, or the like) to a crop. For instance, an application of water to a crop may be manifested as an activation of an irrigation system in the vicinity of, directly onto, or into a crop or crop location. An application, in some embodiments, may relate to the addition of, for instance, a prescribed volume of material, the addition of a material at a particular rate for a designated duration of time, or the addition of material until a threshold or designated concentration of the material is achieved or sensed in or in the vicinity of a crop. In some embodiments, a subtractive application of a crop requirement may, for instance, comprise the provision of shade to a crop, if, for example, a sensor or application coupled therewith determines that a crop is subjected to an undesirably high amount of sunlight. In accordance with some embodiments, an application of a crop requirement may be performed manually or automatically by an irrigation system, non-limiting examples of which are described above.

A crop application may refer to a designated, prescribed, calculated, or recommended application of a crop requirement to a crop. An application may, in accordance with various embodiments refer to a single application of a crop requirement, such as a one-time dosage of water, fertilizer, or pesticide, which may comprise, for instance, a designated volume, or a designated application rate of the crop requirement for a designated duration. In other embodiments, an application may comprise more than one application, both the periodicity and volume of which may be either consistent (e.g. one a day, once a week, etc.) or irregular (e.g. tomorrow, then a week from now, for instance based on a weather forecast). Further, an application regimen may be variable or regularly updated, and may, for instance, may depend on one or more sensed metrics related to a crop.

The term "crop outcome", as used herein, will be understood to refer to any qualitative or quantitative sensed or observed property of a crop that may be associated, directly or indirectly, with a crop characteristic (which may or may not be impacted by pest activity or a certain crop treatment). Examples of crop outcomes may include, but are not limited to, one or more of a crop quantity (e.g. gross weight, net weight, amount of crop waste or crop loss, or the like.), a crop quality (e.g. a grade of crop product), a crop value (e.g. a dollar amount of all crop sales, of crop sales related to a particular grade of product, or the like), crop yield, or the like. The presence or absence of any characteristic of a crop that may impact its market value may be referred to as a crop outcome.

In accordance with various embodiments, a crop outcome may comprise a return on investment (ROI) in view of crop management practices. That is, a crop outcome may relate to a total sale value of a crop in comparison to the expense associated with of applying one or more crop requirements. For instance, a crop in a first location may produce a top-grade product with a sale value of $50, while also producing a lower-grade product for a sale value of $50, following an application regimen that cost $20 over a growing season, resulting in a crop outcome ROI of $80. A second location, subject to a lesser irrigation regime costing $10 over a growing season, may in turn yield only $25 worth of top-grade product, while yielding $75 worth of lower grade product upon sale for a ROI of $90. Such crop outcomes, in accordance with various embodiments, may be utilized by a crop management platform by including historical crop outcomes in a crop management model to improve crop management. Crops may be "graded" according to specific characteristics, which may or may not reflect market value. For example, grain grades are often determined in accordance with specific predetermined crop characteristics. In some cases, a higher-grade crop may be desirable and, therefore, a crop outcome may be the specified crop grade (e.g. Western Red Spring (CWRS) wheat is graded into Grades 1 through 4, CW Feed, and "Wheat"). In some cases, however, certain crop outcomes may relate to characteristics that are independent of pre-determined grading; for example, protein content, protein content distribution amongst a sample, or other measurable or assessable characteristic.

A crop outcome may additionally, or alternatively, include quantitative or qualitative sensed data related to a crop or crop location. For instance, a soil moisture sensor may measure a soil moisture behaviour or response to a particular irrigation application over time. Such data may, for instance, be used to improve understanding and thus better inform future irrigation recommendations with respect to, for instance, water uptake by a crop, a crop's water usage capacity over time and/or as a function of historical water usage capacity, soil drainage in a particular location, a field capacity, an amount of available water, or the like. In other embodiments, a dendrometer or like sensor may be employed to determine a crop's response to a crop requirement application, such as a change in stress level, a maximum allowable depletion with respect to an irrigation regimen, a maximal daily shrinkage, or the like. In yet further embodiments, crop outcomes may comprise combinations of such sensed data and/or yields, and/or may be stored or processed for use in, for instance, irrigation model refinement, the provision of third-party or crowd-sourced data, or the like.

The systems and methods described herein provide, in accordance with different embodiments, different examples of a crop management platform in which sensed crop data may be used in the prescription or recommendation of a crop requirement application to a specific crop location. Various embodiments relate to the employ of a crop management model to prescribe, based on sensed and/or historical data, an appropriate application of, for instance, water, fertilizer, pesticides, and/or chemicals to produce a desired crop outcome. In some embodiments, crop outcome may be used to refine crop management models on a location-by-location basis, and/or for a particular crop type. A model may further be employed to improve an efficiency of crop management. For instance, a management model may consider a cost, either predicted or historical, associated with managing a crop (e.g. the cost of an applied material), as well as a past or predicted yield of the crop, to provide, for instance, an improved return on investment based on different irrigation regimes. A crop model may further consider location-specific sensed metrics to, for instance, prescribe different applications of a crop material to different crop locations at different times, even within crops of the same type and/or on the same farm. Crop models may, in some embodiments, further comprise climate, third-party, and/or crowd-sourced data to improve prescription of a crop requirement to provide a desired outcome. In accordance with various embodiments, a crop management application may calculate various correlations between observed and/or sensed data, for instance to determine or quantify a relationship between a crop response and/or outcome and various other metrics. For instance, a management platform may determine a correlation between a crop outcome or status in view of a location-specific metric and material application record over a growing season to update an irrigation model for future applications.

For the purpose of illustrating at least some of the various embodiments, one may first consider the traditional practices related to irrigation management. Conventionally, a grower may water crops according to a standard or generalized irrigation model. The standard model may, first, be one that is generalized for all crop types in view of, for instance, climate data. For example, the general model may suggest watering all crops every two days, with the amount of water prescribed based on how much rain and how much evaporation is expected to occur based on the two-day weather forecast. The model may then be adjusted for specific crop types. For example, the general model for all crops may, on a crop-by-crop basis, be adjusted according to a crop type coefficient, based on, for instance, how much available water is required in soil for each crop (e.g. an almond tree may require less available water in the soil than a row of corn, or may uptake the available water more slowly than corn, requiring that less water to be added every two days).

Such models, however, while partially crop type-specific, may not fully account for variations in, for instance, soil types, or the particular characteristics of a crop location. For example, an almond tree growing next to a ditch or ravine, or in a generally shaded area, may require watering less frequently than one that grows in a different soil type and is constantly exposed to intense sunlight. The same application of water may then provide different available water profiles in soil in different regions. In this non-limiting example, the shaded crop location near a ravine may then be irrigated with excess water, at unnecessary cost to the grower, and perhaps even negatively impacting some crop-related characteristic that is valuable or desirable to a grower or purchaser of the crop (e.g. delaying growth stages of the crop, delaying hull split for an almond tree, resulting in additional days of the growing season in which a grower continues to irrigate, overwatering or underwatering).

Further, different crop locations may respond differently to the same irrigation application; even if the crop is the same age, same plant type, and planted in a similar soil type. For example, a grower may monitor soil moisture at different crop locations with the intention of irrigating when the available water drops to, for instance, 40%, at which point she will add a designated volume of water as suggested by a standard crop model. That designated amount of water may provide, over time (e.g. over the next two days), different profiles corresponding to available water in the soil at different locations based on any number of environmental, soil, or plant-specific parameters. This may be detrimental, or even crop-destroying, if, for instance, water leaves the soil at a first location much faster than predicted, and the water availability level that is required to sustain the crop drops below a threshold value for too long a duration. Conversely, a different crop location may retain that same amount of water for longer, and any subsequent irrigation is unnecessary and costly.

Conventional systems use a generic soil water model which characterizes water loss (evaporation, runoff, etc.) and plant withdrawal (transpiration) from a reference crop such as well-irrigated and mowed grass which is a function of climatic factors such as temperature, humidity, solar radiation, wind, etc. This may be referred to as $ET_O$, or a reference value for the sum of evaporation of water from the soil surface plus transpiration (water loss) from (primarily) leaves of plants for this reference crop. ETo may vary daily with changes in temperature, relative humidity, solar radiation and wind. These generic models are further made crop-specific in by way of generalized coefficients (sometimes referred to as $K_C$) which are functions of both biotic and abiotic factors of the crop. For example, in grapes, the coefficient is a function of such things as plant spacing, canopy area, and light interception. For many instances, coefficients can be more crudely determined by factors such as crop maturity as well as time within a growing season (e.g. early, mid, late season) where all plants of a specific area will get prescribed the same dose of water based on the coefficient-based correction of the reference crop's water usage: For example, $ET_C = ET_O \times K_C$. In other words, a generic evapotranspiration reference value is used to determine a more crop-specific evapotranspiration $ET_e$ by applying a crop-specific coefficient to ETo, which is itself estimated on a plurality of estimated or generalized factors.

The crop-specific evapotranspiration value can then be used, based on one or more other factors, such as available water in the soil, emission uniformity (e.g. uniformity of water application from drippers vs. sprinklers), and average application rate, to determine a number of important crop-application values, including net irrigation requirements for a given crop in a given region, gallons of water per plant per week, or hours per week of water application. Such additional crop-application values will typically require a further determination of available water, which is typically assessed for a given soil type in a given region. Accordingly, using conventional systems, determining a crop-specific evapotranspiration value requires using a non-location-specific correction factor that is based on a number of estimated or generalized values. This is further used in association with additional estimated or generalized factors to provide a highly specific recommendation, e.g. time of watering over the course of a week, for an entire crop across a given region. This may result in inaccurate watering recommendations, and ones that are not location-specific across a growing region or a farm.

Conventional irrigations practices may further be characterized by maintaining, for instance, available water levels in soil. For example, conventional practices may relate to maintaining a minimum threshold of available water in the soil for all crops of a particular type (e.g. maintaining 40% available water for all almond trees). For some crops, it may be desirable to maintain available water within a specific range (e.g. 40% to 60%), for instance to maintain a particular stress level of a crop, and/or induce or inhibit different crop stages (e.g. hull split, flowering, etc.). Naturally, a grower may prefer to maintain soil moisture near a lower threshold level, so to minimize expenses and time associated with irrigation. However, such generalized recommendations may not be optimal. Further, various stages of crop growth may require different soil moisture levels. For example, a general model may recommend that a crop location having an almond tree maintain a 40% available water for an entire growth season, when in actuality it may require 50% available water for the first three weeks of a growing season, but only 20% available water for subsequent months, to achieve the same crop outcome. A grower following a general model may then be underwatering early in the season, at the expense of delaying particular crop stages (e.g. flowering), and requiring irrigation longer into a season. Later, overwatering is performed at the expense of time and cost. Such issues may be compounded by, for instance, the abovementioned challenges relating to different crop locations behaving differently to irrigation applications based on location- and crop-specific parameters.

Soil type, soil watering, environmental conditions, and individual crop/plant characteristics create changes in localized crop and/or soil conditions (e.g. water capacity, water holding capacity, crop water usage, crop uptake, or the like) over time. In addition, not all almond trees (even trees of similar ages and that are close together) may take up equal amounts of water, not all locations will experience similar evapotranspiration, and there may be variations of water-retention within soil types, placements, and/or densities. That is, even from crops in the same soil type, various other factors may affect, for instance, an amount of water available to a crop, such as a crop spacing, age, canopy structure, or the like. Accordingly, treating all plants and all locations within a region having, for instance, the same soil type in the same way, may be suboptimal, may negatively impact crop outcomes, and/or may be wasteful and may detract from a grower's return on investment (or ROI). In general, ROI is considered to be the difference between growing costs and revenue, but may also be used to refer to a cost factor associated with obtaining a specific desirable crop outcome (or set of outcomes). Current methods do not associate specific or location-specific crop outcomes with actual irrigation and/or watering events (or indeed other types of crop application events).

A need therefore exists to provide irrigation recommendations on an improved and/or crop location-specific basis. Further, a need exists to improve upon irrigation models to provide recommendations that improve crop outcomes, for instance by providing a more optimal return on crop sale for a grower in view of irrigation application regimens.

Conventional systems use a variety of sensors plus historical data, typically relating to soil type or other soil characteristics, to determine "available water"; that is, the level of free water, expressed as a percentage, that is "available" for uptake by plants, where 100% means that no further water can be held by the soil (e.g. a saturation point), and 0% is the point at which water in the soil cannot be extracted by plants. Some embodiments hereof may employ sensors to measure certain values relating to soil moisture, at a plurality of locations in a growing area, which may be used to determine or estimate various soil moisture metrics, non-limiting examples of which may include available water or seater/soil moisture realized. In accordance with some embodiments, measured values may serve as a proxy for one of these soil moisture metrics.

In some embodiments, moisture sensors provide an indication of such soil condition at specific locations. For example, a moisture sensor may indicate, or otherwise be related to, an amount of moisture, or depth of the water column, at each almond tree within an almond tree orchard, over time. Further, various embodiments relate to the use of an irrigation management system employing such sensors to associate and/or determine how a given crop location reacts to irrigation applications, including by associating crop outcomes with moisture readings at such specific locations. By tracking the soil moisture metrics over several applications, various embodiments relate to the development of a model that will predict how the exact crop location will react to potential future irrigations of a given amount. Rather than following a general model which may provide suboptimal (or even detrimental) irrigation suggestions, embodiments described herein may enable an improved and/or accurate prediction of what, for instance, soil water availability will be for that particular location tomorrow after an irrigation today. Location-specific coefficients, therefore, provide a way to determine the available water that will be realizable by a specific plant or group of plants in view of a given irrigation event or series of irrigation events, which may, in accordance with various embodiments, include one or more of an irrigation application(s), or precipitation, including rain, snow, hail, or other precipitation. In some embodiments, an irrigation event may exclude rainfall, or certain portions thereof, such as the first or last portions which may not be realizable; in other embodiments, precipitation may be treated differently from an irrigation application by tracking the amount of rainfall (or other type of precipitation) and treating the realizability for the crop growing area differently than that of an irrigation application, including on a location-specific basis. The respective location-specific impacts of precipitation and irrigation events, whether on soil moisture, soil moisture depth, water realizability or any other characteristic relating to water as it relates to soil, crops, or crop growing areas referred to herein, may be treated differently, including because precipitation is generally applied equally over a crop growing area, whereas irrigation events may be more location-dependent (e.g. distance from a dripper or sprinkler, or other irrigation source, will impact water-related characteristics). In some embodiments, rainfall measured in one area can be presumed to be applied evenly across surrounding crop growing areas. In some embodiments, in view of this observation, contribution from rainfall, or some partial amount thereof, may be deducted from (or as otherwise equally impacting) all sensed characteristics from surrounding sensed location, based on a single measurement. Further, crop outcomes can be associated with past soil moisture metrics, in a locational-specific manner (including the specific locations of each plant or group of plants within a field or other crop growing area), in order to associate particular outcomes with a particular soil moisture metric (e.g. available water or realized water), or profile thereof. For instance, and in accordance with various embodiments, crop outcomes may be associated with maintaining, over the course of a growing season and on crop location-specific basis, a particular level of available water, or a particular available water profile as a function of time, at the crop location to provide a more optimal ROI.

In some embodiments, methods and systems hereof use sensed, historical, and/or other acquired data to define a relationship between expected forecasted water usage from generalized models and realized water usage. In some embodiments, this relationship can be highly location-specific (although it need not be—it may in some cases encompass a broader growing region), and, moreover, it relies on actual data and fewer generalizations, estimates, and/or assumptions than do current relationships based on crop-specific expected forecasted water usage. In some embodiments, methods and systems hereof may alternatively or further define a relationship between the amount of water that was expected to be added upon irrigation, and realized water in the soil. In some embodiments, the combination of sensed, acquired, historical and other data, as described herein, may, from any two of the following three metrics, solve for the third at any point in time: soil water status, irrigation amounts, irrigation timing. In other words, it does not rely (or in some case, relies on much less) the crude assumptions inherent in conventional assessments of $K_C$, as described above.

For instance, and in accordance with various embodiments, an irrigation management system or method may determine a realized water content, or an amount of water that may realistically be available to a crop in a crop location, also referred to herein as "plant-realizable water" or "crop-realizable water". That is, while a conventional or generalized irrigation model may assume that, for instance, a particular soil moisture level, as measured by a sensor in a particular soil type, corresponds to a particular rate of evapotranspiration and/or rate water uptake by a given crop, the assumptions made in such a determination may not account for various crop location-specific factors. For example, soil at a first crop location, which provides the same moisture reading as at a second crop location, may retain water more strongly than soil at the second location, resulting in less water being available for uptake by a crop. Further, different crop locations, or soil moisture levels thereof, may respond differently to irrigation events. For example, the application of a particular volume of water may raise soil moisture content differently in different crop locations, resulting in variable amounts of "realized" water that may be taken in by a crop. On the other hand, various embodiments described herein relate to the determination, on a crop location-specific basis, the amount of water in soil that may realistically be available for crop uptake. For instance, various embodiments relate to determining how, for instance, a soil moisture sensor reading or a particular irrigation event translates, in practice, to a rate of water uptake by a crop. Such determinations may further be agnostic to crop or soil type, through calibration of sensor readings and actual crop requirement metrics on a crop location-specific basis. Crop-realizable water may be assessed differently over a growing season; for example, a crop location associated with a plant in the same season, having the same soil moisture characteristics and other environmental parameters, may nevertheless have or be deemed to have a different amount of crop-realizable water. This may be in part because of crop-related changes during the growing season, including changes to roots or the size or spread or depth thereof, or changes in rates of transpiration due to changes in plants occurring during the growing season.

In some embodiments, plant- or crop-realizable water may refer to available water. It can refer to the level of water that is between the maximum amount of water that can be held or retained by a given soil profile for the purposes of being taken up or realized by plants (this level may be referred to as field capacity or soil capacity) and the wilting point, which may comprise the level at which water may not be extracted from soil. The available water may be expressed as a percentage or fraction, where the wilting point may be 0% (or 0) and the field capacity is 100% (or 1). In some embodiments, the realizable water may not be coextensive with this range as, for example, the wilting point or the field capacity for a given soil profile may be impacted based on a particular plant's ability to "realize", "pull", or "absorb" certain levels of water based on a number of different variables (e.g. soil density, soil contents, root density and reach, plant type, plant maturity, temperature, atmospheric pressure, season, other factors, and combinations thereof). In some embodiments, other models may be incorporated to assess additional characteristics, and actual and predicted metrics associated therewith; for example, the impact of amounts, changes thereto, and rates of change of realizable water or soil moisture may have an impact on plant nutrients or other soil components and characteristics associated with or needed by crops. This may include components and/or characteristics that impact growth rates, plant stress, seed/nut hull split timing, resistance or susceptibility to pests (including insects, disease, fungus, etc.), or other factors relating to crop growth or crop value. In the foregoing example, soil nutrient above and below root levels can be modeled based on soil moisture and/or soil moisture depth and/or realizable water; by incorporated nutrient-related models that use water as an input to such model, embodiments hereof may be used to assess, plan, manage, or predict nutrient levels and changes thereto, on a location-specific basis, based on an assessment of realizable water in accordance with embodiments hereof.

In some embodiments, plant-realizable water or relationships related thereto may provide an improved, and in some embodiments, a location-specific way to determine plant-level water usage, which in turn allows the extrapolation away from sensor values with respect to conventional generalized variable(s) (e.g. soil type variation, canopy size from imagery, plant type, etc.), as well as interpolation between an array of sensors on known variable(s). Such known variables may include available water, realized water, or other soil moisture metrics or proxies therefor (e.g. moisture depth). For example, tensiometers may, in some embodiments, measure the soil moisture tension (i.e. that measure the relative difficulty a plant may have in "pulling" water out of soil), to assess how much water may realistically be available for uptake by a crop. Alternatively, or additionally, soil moisture sensors may measure a depth at which moisture is available, for instance via multi-point readings at various depths, or by a plurality of sensors at different depths. Such measurements may in turn be used to assess available water. Available water capacity (or "AWC"), Soil Water Tension, and soil moisture depth, are exemplary soil moisture metrics; others may be used, as would be known to a person skilled in the art.

In some embodiments, methods and system hereof use plant level water usage predictions to prescribe a water dose and timing thereof to, for instance, keep the available water over a certain threshold, or within a particular range over a day, a week, etc. Further, the number, duration, and/or timing of watering events can be determined in order to maximize the amount of realizable water, and maintain available water in a specific location within optimal or specified ranges, or above one or more thresholds, and whether these ranges and/or thresholds should change over a growing season. For example, more frequent watering events are generally more expensive from a power consumption perspective than less watering events, even if the same water is applied, and power and water may be less expensive at certain times.

In some embodiments, methods and system may provide the most efficient water target based on data (i.e. provide a range or threshold of available water). Further, embodiments may enable simulation, based on potential or planned watering events (including irrigation and rainfall), future water data, and provide any or all the relevant parameters related to timings and amounts of applied water to achieve and maintain the prescribed water target. These irrigation scheduling parameters may then be loaded onto a control system to implement prescribed schedules. Feedback related to observations and/or performance of the prescribed schedule may be taken into account in a feedback loop to alter each future event prediction(s). In some embodiments, the prescribed watering schedule may be used in connection with the control system to implement optimal watering schedules that, inter alia, result in more efficient irrigation control and/or improved ROI (or other crop outcome). For example, many irrigation systems have inherent limitations relating to pumping efficiencies that mean that it is not possible to simply turn on all, or even more than a certain number of, irrigation control systems concurrently; generating sufficient water pressure or pump force to cause all irrigation control devices to operate concurrently is often not practicable, and, accordingly, crop growers must rotate irrigation control systems to ensure all of the operating devices have sufficient water pressure, or indeed water, to operate as intended or expected. Moreover, some irrigation control devices, e.g. a sprinkler or sprayer, may have different operating characteristics or operating parameters; for example, a sprinkler near a pumping station may have a higher volumetric flow rate and therefore distribute more water in the same or less time, than another sprinkler that is more remote from the pumping station. Embodiments hereof can take such operating parameters into account: methods and systems hereof provide location-specific predictions and assessments relating to realizable water therefor, as well as changes thereto in the future, and can incorporate irrigation control system parameters associated with each of the applicable locations to plan and then implement irrigation events in accordance with an optimal schedule that (1) ensures timely watering of all crops that keeps realizable water within desirable ranges (or above or below a threshold) that meets the limitations of the irrigations control system and devices thereof; and/or (2) minimizes energy utilization associated with the irrigation control system by planning and implementing a watering schedule that addresses the realizable water objectives of all locations associated therewith. In some embodiments, there is provided a data processor capable of determining a control schedule for irrigation control systems that maintains realizable water within desired ranges (or thresholds) while ensuring that irrigation control systems, including some or all of the individual irrigation devices associated therewith, are operated within required, desired, and/or optimal operational parameters. In some embodiments, said data processor can further select from multiple possible schedules that achieve the foregoing and that also achieves, or is intended to achieve, improved specific crop outcomes, including ROI. Such embodiments include a data storage component for storing such scheduling information, control devices, and a communications network (wired or wireless) for communicatively interconnecting said data processor, said data storage, and said control devices.

In some embodiments, methods and systems hereof provide for calibration across many plant locations. This may include, for instance, standardizing crop outcomes (including ROI or ROI-related outcomes) in view of water availability across sites and sensors. This calibration can be used to modify the "optimal" or prescribed soil moisture metric targets, including both across and within different seasons.

Accordingly, one embodiment relates to sensing a crop requirement metric at a specific crop location, and calculating location-specific soil properties to provide improved irrigation application suggestions. For example, two crop locations may have respective almond trees, where two soil moisture sensors associated with two crop locations send respective soil moisture readings (i.e. one sensor and reading per location) to an irrigation management platform, every ten minutes. The platform, having access to digital processing resources, may monitor over time how the soil moisture varies in each location. For example, it may monitor how soil moisture decays over time in the absence of irrigation, and/or how quickly it rises following a particular irrigation application, at each location, to determine crop location-specific properties (e.g. soil moisture changes more slowly at Crop Location A, Crop Location B saturates at a higher soil moisture level, etc.). An irrigational model may then be applied to predict how each crop location will respond to irrigation to prescribe recommendations that are highly specific to a crop location, rather than recommending a prescription generalized to the crop type, the latter of which may be inefficient or detrimental. For example, a location-specific model may apply a location-specific coefficient to a generalized model (e.g. the generalized model is multiplied by a coefficient of 0.4 for the almond tree at Crop A, and 0.5 for the almond tree at Crop B), whereas the conventional model may apply the same coefficient for both crop locations regardless of location-specific properties (e.g. Crops A and B, both having almond trees, are prescribed irrigation based on multiplying the generalized model by a coefficient of 0.45).

Such crop location data may be acquired across many crop locations. For instance, soil moisture readings may be acquired not only across tens of locations on a single farm, but across many farms, over several years, to provide millions of data points to an irrigation management platform for analysis. Such data may be used to, for instance, determine correlations between various parameters to improve irrigation recommendations.

For instance, and in accordance with one embodiment, an irrigation management platform may receive crop outcome data to inform irrigation recommendations. For simplicity, this embodiment will be described with respect to two crop locations each having an almond tree, but the skilled artisan will appreciate that these concepts may be applied, in accordance with various embodiments, to a platform with access to millions of data points across thousands of crop locations to improve crop management practices.

In this example, a crop management platform may receive season-long soil moisture profiles sensed at two crop locations, each having an almond tree growing therein, and each having been exposed to the same irrigation regimen recommended to maintain the crop location at 40% available water in the soil. For example, growers of both the first location (Crop A) and second location (Crop B) may be recommended to irrigate every two days with 20 litres of water per irrigation. However, due to, for instance, differences in crop location parameters, soil moisture readings indicated that Crop A averaged 40% available water for the duration of the growing season, while Crop B averaged 40% water availability for the first month, and 25% available water for the remainder of the growing season. In this example, however, the grower of Crop A reported hull split for the almond tree 5 days later than the grower of Crop B, and Crop A required two additional irrigations totaling 40 litres. Both growers however, report the same value upon sale of almonds from their respective crop locations.

In this simplified exemplary embodiment, the irrigation management platform may determine, from correlating crop outcome (e.g. ROI) with irrigation application data (20 litres of water every two days) and crop requirement characteristics (e.g. available water profiles over the season), that an irrigation model, for crop locations comprising almond trees, may improve a return on investment (e.g. the value of a crop upon sale minus the cost associated with irrigating the crop) when available water (i.e. a crop requirement characteristic) is maintained at 25% after the first month of a growing season. Further, in this example, the platform may process the raw soil moisture readings over the season for each location (each moisture reading being associated with an available water profile at each location) to determine that the crop location of Crop A yields, for instance, a slow response to an irrigation (e.g. rises slowly upon irrigation and decays slowly thereafter), while Crop B responds rapidly to irrigation and subsequent drainage/evaporation. Therefore, in the subsequent year, both locations may have a recommended target characteristic profile (e.g. available water profile target for the season) that averages 40% for the first month, and 25% thereafter. The platform, having characterized both crop locations based on soil moisture readings, may suggest that Crop B be irrigated similarly to the previous season (i.e. with 20 litres of water every two days), while suggesting to the grower of Crop A that after the first month, the crop location should be watered every three days with 15 litres of water per irrigation, based on how slowly water levels decayed after irrigations. In this exemplary embodiment, the irrigation management platform may further be operable to apply such irrigations automatically. For example, the platform may output a control signal to networked automatic irrigations lines to trigger release of the recommended amount of water over a designated duration (e.g. 4 hours). Further, irrigation deployment devices, such as irrigation lines, may report on the volume and timing of water applications to the platform for application data collection for analysis and future correlations (e.g. correlating water applications with a crop outcome for each location) to better inform future irrigation practices. Such reporting may comprise, for instance, and without limitation, the receipt by an irrigation management platform of irrigation signals from pressure transducers associated with irrigation deployment devices, from a user interface (UI), such as one associated with a networked device (e.g. smartphone, personal computer, or the like), or directly from an irrigation control box.

These and various other non-limiting embodiments will now be described with respect to the Figures.

With reference to FIG. 1, and in accordance with one exemplary embodiment, a crop management process, generally referred to using the numeral 100, will now be described. In this example, a locally sensed metric 110, sensed by a location-specific sensor associated with a crop location, may be received by a crop management application 130. The crop management application 130, comprising digital data processing resources or access thereto, may be configured or otherwise operable to access a crop requirement model 132. The model 132 may in turn comprise one or more terms, functions, or instructions, and may be operable to receive the sensed metric 110 and to output an irrigation application recommendation 140.

As schematically represented in FIG. 1, a locally sensed metric may comprise any one or more direct or indirect measurements representative of a crop requirement, crop characteristic, or crop status related thereto. For instance, a water sensor may be operable to sense a soil moisture level 112. Soil moisture 112 may, in accordance with some embodiments, be recognized by a crop management application 130 or model 132 associated therewith as related to, for instance, available water in the soil for crop uptake, or a plant's water usage capacity. The crop management application 130 may then, based on the sensed metric (e.g. moisture) and associated crop characteristic (e.g. available water), output an irrigation application recommendation 140. For instance, if soil moisture 112 is below a designated level, the crop requirement model 132 may provide a recommendation 140 that a large quantity of water should be applied to a crop, or should be applied for an extended period of time. Conversely, if a high soil moisture 112 is sensed in a particular location associated with a crop, the model 132 may, for instance, recommend that an irrigation not be applied, the lack of need for which the application 130 may optionally indicate. In some embodiments, the model 132 or management application 130 may provide an estimated future time to irrigate the crop.

Similarly, a crop requirement metric 110 may comprise any one or more of, but is not limited to, a crop fertilizer level 114, a soil salinity measurement 116, a temperature 118, or a dendrometer reading 120. The model 132 may, depending on the type of crop, comprise terms related to a geographical characteristic of the plot (e.g. an amount of sunlight received during the day, an expected evapotranspiration, or the like), and/or other relevant parameters. A model 132 may further be operable to receive any one, more than one, or combination of locally sensed metrics 110 in order to output an application recommendation 140. For instance, a dendrometry measurement 120 may provide an estimation of a plant stress level or a current state of the crop. A model 132 may receive this indicator of plant stress so to correlate the dendrometer reading 120 with a preferred irrigation application so as to achieve a desired plant stress level after application. In accordance with various embodiments, achieving a plant status that is either stressed or not stressed may be desirable, based on the type of crop production that is desired. For instance, it may be desirable to maintain a moderate and/or constant stress level to induce or prohibit flowering or seeding, or to inhibit or promote growth.

Further, one or more sensed metrics 110 may be used by a model 132 to calculate or otherwise infer one or more other metrics. For instance, and in accordance with at least one embodiment, a soil moisture metric 112 may be used to infer, for instance via a correlation, formula, known relationship, or model 132, a plant stress level that may otherwise be determined using, for instance, a dendrometer. For example, the model 132 may, based on a soil moisture metric 112, infer a current plant stress level, and/or determine a water application so to align the amount of moisture or water in the soil with a corresponding designated plant stress level. Such embodiments will be further described below.

Upon determining a crop irrigation recommendation 140, various embodiments relate to the subsequent application 142 of a crop requirement in accordance with the recommendation 140. For instance, a soil moisture metric 112 may inform a crop management application 130 of a water requirement in a specific location of a crop field. The application 130 may then calculate using a crop requirement model 132 an appropriate irrigation recommendation 140, a signal corresponding to which may be output by the irrigation platform 130 and received by an irrigation system to initiate a corresponding application 142 of water at or near the crop location.

Various further embodiments relate to real-time or subsequent sensing 144 of the application of the crop requirement. For instance, flow meters and/or pressure transducers may monitor 144 the amount of a crop requirement or combination thereof (e.g. water and fertilizer) that is applied to a crop. Such embodiments may relate to, for instance, verifying that an application 142 is in accordance with a recommendation 140. Such sensing 144 may, for instance, further be employed to direct or control an application 142 of a crop requirement. For instance, one embodiment relates to a process in which a crop requirement application 142 proceeds until a designated volume of a crop requirement has been applied as determined by sensing 144 volumetric flow. A management application 130 may then trigger cessation of the application 142 via, for instance, sending a halt signal to an automated irrigation system, or by providing an indicator to a farmer that she has applied the recommended amount of a crop requirement. Various embodiments further relate to systems comprising instrumentation operable to execute such application 142 of a crop requirement and/or sensing 144 thereof. Accordingly, various embodiments relate to application suggestions 140 being automatically implemented by material deployment devices (e.g. automatic irrigation networks in networked communication with the material management platform 130), while other embodiments relate to the provision of application suggestions 140 that may be indicated to a grower, for instance via a digital platform (e.g. an internet browser-based interface, a smartphone application, or the like). In embodiments related to the latter, the grower may then, for instance, manually apply application suggestions as per the grower's common practices (e.g. a material distribution conduit, a material reservoir associated with the crop location, a tractor or other vehicle-based material distributor, a combination thereof, or the like).

In accordance with various embodiments, a crop outcome 150 may be determined following application 142 of a crop requirement. As will be further discussed below, a crop outcome 150 corresponding to an applied irrigation 142, or a crop response to an application 142 may be used in, for instance, subsequent improvement of a crop requirement model 132 with respect to crop yield, profitability, or the like.

Various embodiments further relate to the use of external data 122 to further inform a crop management application 130 to calculate, at least in part on a locally sensed metric 110 and via a requirement model 132, an irrigation recommendation 140. For example, a model 132 may comprise a term or function for a known or expected amount of precipitation from climate forecast data 124, and accordingly adjust a recommended amount 140 of water to be applied to a crop. Conversely, if climate data 124 suggests that a drought, dry spell, or high degree of evapotranspiration is predicted, a crop requirement model 132 may account for such and recommend 140 an increased irrigation application. Such climate data 124 may, for instance, be accessed by a crop management application 130 via a wireless network or internet protocol, or read from a database of climate-related forecasts, or historical data (e.g. historical temperatures over a growing season, or a historical snow cover duration of a particular crop location, or the like). Further embodiments relate to climate data 124 obtained from a weather station or like source.

Various other data may further be accessed by a crop management application 130. For instance, third-party data 126 such as aerial imagery of a crop may be indicative of, for instance, a crop status, that may be employed in a model 132 to provide an irrigation recommendation. Further, and in accordance with at least one embodiment, crowd-sourced data from other locations, whether real-lime or historical, may further inform a model 132 for providing a recommended irrigation output 140. For example, a first farm employing a system or method as herein described for managing irrigation may only acquire data for a single crop location of a particular type (e.g. on a South-facing slope). However, a nearby farm may in parallel monitor a similar crop location type. A crop management application 130 may, in some embodiments, access such third-party data, and/or crop outcome data related to that location type, for input into a crop requirement model 132 to provide an irrigation suggestion 140.

In accordance with various embodiments, any one or more of sensed data 110, external data 122, application suggestions 140, actual material application data 142, sensed data 144 related thereto, or crop outcome data 150, may be stored in a database associated with the material management platform 130 as historical data 134. The crop management platform 130, having, for instance, a digital data processor associated therewith, may access historical data 134 to determine if a correlation exists between any or all of the stored data 134. Various embodiments further relate to a crop management application 130 accessing historical data 134 for input into and/or for improving a model 132. For instance, a crop management application 130 with access to processing resources may access stored locally sensed metrics 110, crop outcomes 150, or external data 122 to determine a correlation between various parameters, and, in further embodiments, update a model 132 accordingly. Such correlation may be determined, for instance, by an artificial intelligence or machine learning system or process, or other means known in the art for determining a correlation between two or more parameters. In accordance with other embodiments, historical data in conjunction with a crop requirement model 132, may provide, for instance, lookup tables for a preferred irrigation recommendation 140 for a desired crop outcome 150 based on a locally sensed metric 110, in view of a received climate forecast 124.

Figure 2:
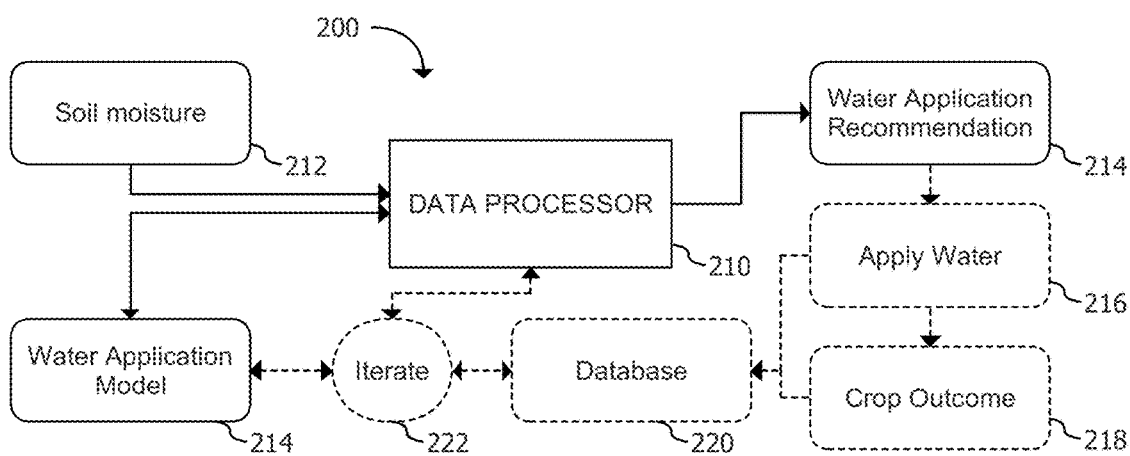
FIG. 2 is a schematic diagram of an exemplary process for prescribing irrigation applications based at least in part on sensed soil moisture values, in accordance with various embodiments.

With reference now to FIG. 2, and in accordance with one exemplary embodiment, a crop management process for managing the application of water to a crop, generally referred to using the numeral 200, will now be described. In this example, a crop management application comprises a digital data processor 210 configured to access a soil moisture reading 212, as measured locally at a crop by a soil moisture sensor, and a water application model 214. Upon execution, the processor 210 may output, based on the soil moisture reading 212 and model 214, a recommended water application 214. In some embodiments, the process may continue by instigating application 216 of the recommended irrigation 214, either automatically via a digitally implemented process with a compatible irrigation system or by displaying the recommendation 214 to, for instance, a farmer via a digital platform (e.g. smartphone application web browser, or the like). A crop outcome 218, such as a plant's stress response over a designated duration of time, or a yield of the crop, in conjunction with data related to the water application 216, may be stored in a database 220. The data processor 210 may then access the database 220, and iteratively improve 222 the model 214 based on, for instance, a correlation found between the sensed metric 212, the amount of applied water 216, and the crop outcome 218.

For instance, and in accordance with at least one embodiment, an irrigation management application may presume in the first season of use a water model 214 that is predetermined, input by a farmer, prescribed by an organization, or the like. However, over the course of the growing season, it may be found that this model over-prescribes irrigation of a crop in a particular location, or over a certain window of time. For instance, the available water in the soil, as measured 212 by a soil moisture sensor, may rarely drop as much as predicted by the model 214. As a result, a crop outcome ROI 218 may be lower than was expected, as the addition of costly amount of water did not significantly improve crop yield. The data processor 210 may, in this illustrative example, update the crop model in process 222 to, for instance, reduce the recommended amount 212 of water application 216 in a subsequent season for a range of sensed soil moisture levels. Such embodiments therefore relate to the provision of a crop outcome-based feedback system and method for improving crop management based on a locally sensed metric.

Figure 3:
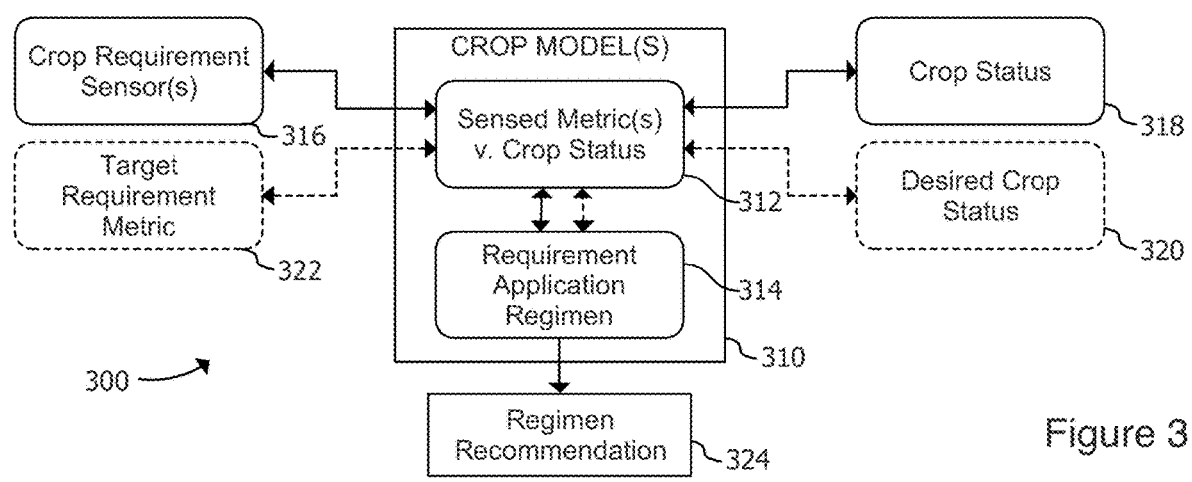
FIG. 3 is a schematic diagram of an exemplary process for prescribing irrigation applications based at least in part crop location-specific models, in accordance with some embodiments.

With reference now to FIG. 3, and in accordance with various embodiments, model-based crop management process, generally referred to with the numeral 300, will now be described. In this example, a crop management system or process may employ one or more models 310 relating a locally sensed metric with a crop status to determine a crop requirement application recommendation 324. In one illustrative process, a crop requirement sensor 316 may detect a current and/or historical crop soil parameter which, based on a crop status model 312, may correspond to a current crop status 318. For example, a crop's water usage capacity (WUC) may at a particular point in time be dependent to a degree on how starved that crop is of water, both presently and historically.

For the purpose of illustration, one may consider that a healthy crop may comprise a WUC with a value of 0.5, while that a starved plant may have a WUC of 0.2. When supplied with water, the WUC of the starved crop may raise to 10.0 while experiencing a glut, followed by a reduction to a stable health state of 0.5, until it once again is starved of water. Knowledge or data of such behaviour for a particular crop and/or location may allow, in accordance with various embodiments, for the generation, tuning, or updating of a model 312 for the determination of a crop status based on the sensed amount of water 316, and/or the rate of consumption of water in the soil by a crop.

In accordance with various embodiments, a particular crop may have a predetermined target crop status 320. For example, it may be preferred that a crop such as a nut tree remain in a relatively starved state for optimal production characteristics, or to improve a harvest efficiency (e.g. harvest efficiency may be considered to induce an early hull split to ensure that most nuts fall from the tree upon shaking), or that a fruit tree be sated with water. Based on a known or determined relationship 312 between a target crop status 320 and/or a target requirement metric 322, as well as a with knowledge of a current crop status 318 and/or sensed crop requirement metric 316, a crop requirement application regimen model 310 may further, in accordance with various embodiments, calculate a regimen recommendation 324 that may be applied to the crop so to bring the crop to the desired status 320. Additionally, or alternatively, if, for instance, a soil moisture reading 316 indicates that the soil is below a target moisture level 322 corresponding to a desired crop status 320, as determined by a crop status model 312, a requirement application regimen model 314 may recommend an irrigation regimen 324 to bring to soil to the desired moisture level 322.

A locally sensed crop requirement metric 110, in accordance with at least one embodiment, may comprise a depth or height of a water column at a particular location, such as the total millimeters of water in the profile illustratively shown as a function of time in calendar days in FIG. 4A. In some embodiments, such a sensed metric may be measured by, for instance, a soil moisture sensor, a soil moisture sensor having sensing modules at various depths in the soil in the crop location, or by various sensors positioned at various depths in the crop location, in order to determine a total or weighted total water profile representative of available water in the profile. Such sensed metrics may be sent to or acquired/accessed by a digital irrigation management platform to characterize the crop location. For instance, by analyzing rates of rises and falls in the total water profile over time, an irrigation management application may determine, for instance, one or more coefficients and/or decay constants characteristic of that particular crop location related to, for instance, water uptake by a crop, water loss due to evapotranspiration, water drainage, characteristic decay rates in water availability, or the like. Such analysis may further provide, for instance, a crop location-specific coefficient by which to weight, for instance, a generalized irrigation model in view of a weather forecast. That is, rather than transforming a generalized model by a coefficient representing all crops of the same type as may conventionally be employed by a grower or model, such a sensed metric profile may be processed to extract a crop location-specific coefficient for the crop location itself, which may differ between crops of the same type at different locations.

Further, and in accordance with some embodiments, monitoring of the total water profile over a growing season, as in illustratively shown in FIG. 4A, may provide insight as to the maximum (e.g. saturation point) or minimum amount of available water may be maintained in soil at that crop location, or generally to characterize soil behaviour with respect to a water profile or available water.

FIG. 4B shows the temporal historical view of the weighted total water profile sensed at the crop location from FIG. 4A. In this example, however, and in accordance with various embodiments, changes in soil moisture related to application of water are highlighted by data points 410 having a lighter shade. In this example, changes in the weighted total water profile, and therefore an available water associated therewith, may be recorded in association with irrigation data. For instance, an irrigation deployment device having automatic water deployment capabilities may communicate an irrigation control signal related to, for instance, a time, flow rate, volume, or the like, of water applied for tracking by an irrigation management platform. The resulting rise 410 in the water profile may be then be characterized by the platform, such as by determining a degree of change in soil moisture or available water upon a particular application (e.g. ~250 mm increase 410 in the water profile), a rate of change upon application, a growth or decay constant associated therewith, or the like. Similarly, any drops in water level, such as the decay 412, may be correlated with irrigation applications, or may be used to determine similar decay constants or rates associated with the specific crop location in the absence of irrigation for, for instance, a particular sensed temperature, humidity, amount of sunlight, or the like. Further, crop location-specific characteristics related to changes in water level associated with irrigation data may comprise, for instance, continued rise in water level upon cessation of irrigation, as shown by peak 414 in FIG. 4B, where water level continued to rise briefly after irrigation before decaying. While this example relates to the total water profile in FIG. 4A equating to the weighted total water profile in FIG. 4B, various other embodiments, as described below with respect to FIG. 5, relate to such profiles not being equal. For example, various embodiments relate to the application of a coefficient to convert a particular metric of water applied (e.g. inches, duration, volume, or the like) to a different value characterizing water at a crop location, such as actual height of a water column or water availability in the crop location following an irrigation event.

Figure 5:
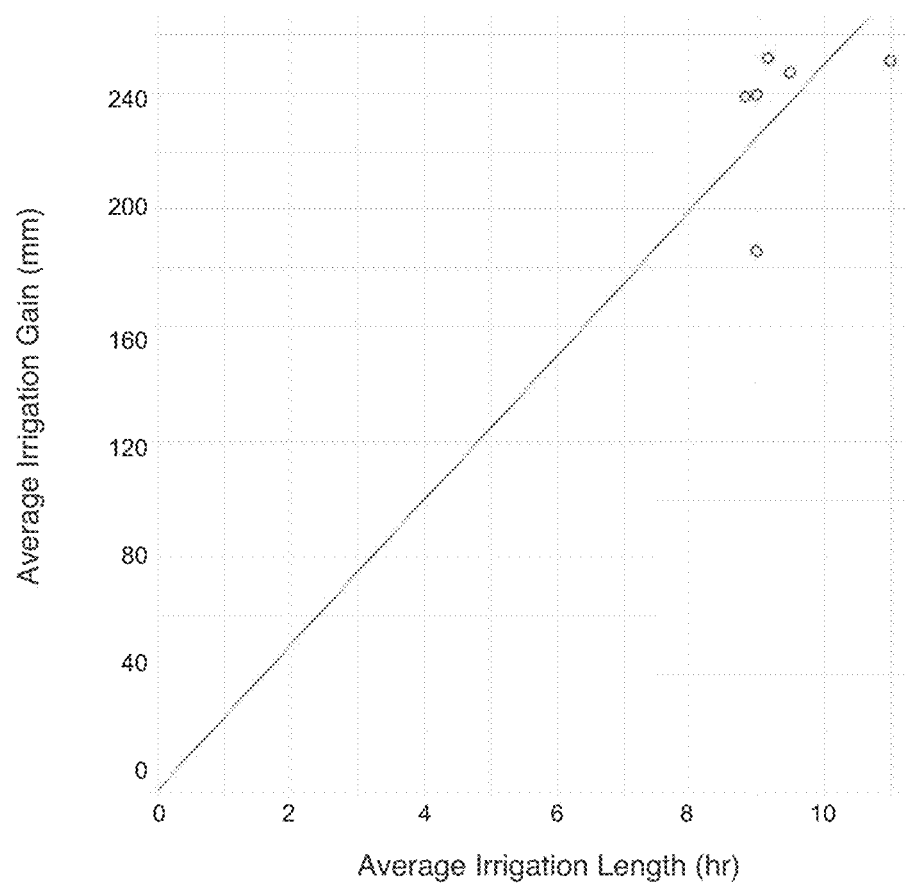
FIG. 5 is an exemplary plot illustrating irrigation gain as a function of irrigation length, in accordance with some embodiments.

FIG. 5 shows, in accordance with one embodiment, one example of how historical plots of sensed data, such as those shown in FIGS. 4A and 4B, may be employed to extract a crop location-specific coefficient. In this example, the average amount of water level gain in millimetres is plotted versus the amount of time irrigation was active, as determined from irrigation data received by an irrigation management platform via irrigation control signals. Plotted data may then be fit, as shown in FIG. 5, to extract an irrigation coefficient representative of that particular crop location. For example, the realized effects of an irrigation events may depend on various factors, non-limiting examples of which may include crop location-specific properties (e.g. soil types, crop types, crop distributions, crop canopies, crop location topology, etc.), the irrigation system employed (e.g. system flaw rates, system geometries, irrigation type, such as drip irrigation or flood irrigation, etc.), or the sensor(s) used to acquire data (e.g. sensor type, sensitivity, accuracy, etc.). For instance, a first grower may apply 1" of water to a crop location have a first crop location, and receive sensor data indicating the water profile increased by 1". However, a second grower may also attempt to apply 1" of water to a different crop area, but may receive sensor data indicative of a 3" increase in the water profile due to water only spreading around irrigation drippers in the vicinity of the sensor. Accordingly, an irrigation platform, in accordance with various embodiments, may ascertain via analysis of plots such as FIG. 5, a crop location-specific coefficient with which to normalize irrigation system output and sensed soil moisture readings with realized crop location parameters. In the example of FIG. 5, the fit data provides a coefficient representative of how much water is actually realized within the soil column per length of time of an irrigation event. Such relationships may be used in, for instance, subsequent modeling to, for instance, recommend an amount of water to be applied in a future irrigation based on, for instance, a current sensed water level and a desired water level target. For example, if the soil profile is sensed to be 600 mm, and the grower or crop model suggests a profile level of 750 mm, the coefficient may be used to determine how long to irrigate the crop location with the irrigation system at the crop location and in view of characterized crop location-specific response to irrigation to add 150 mm to the water column. More generally, fits such as that in FIG. 5 may be employed to normalize across crop locations and/or sensors. For instance, while a grower may apply 2" of water (or another metric of discharge, such as depth per hour multiplied by the irrigation length, or the like), only 1.5" increase may be realized in that the water is available for uptake by a crop. Such normalization, coefficient or weighting factor modeling, and/or fitting of crop location-specific data, may account for system deficiencies and/or variability. Further, in some embodiments, such data and/or coefficients may alternatively, or additionally, be used to recommend an irrigation length based on a measured current amount of available water in view of a desired target level of available water in the soil (e.g. how much water to add to bring available water in the soil from 40% to 60%).

Figure 6:
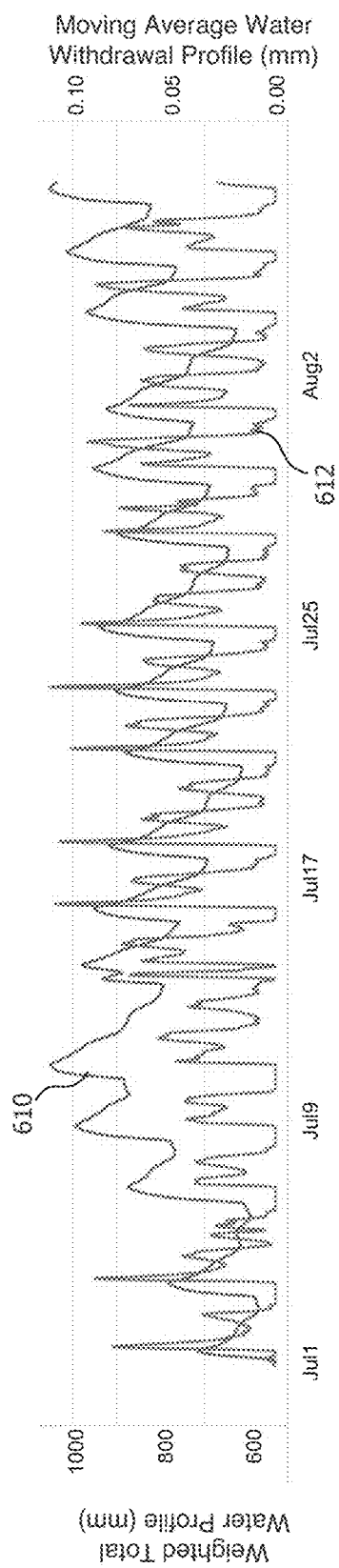
FIG. 6 is an exemplary plot illustrating a water profile and a water withdrawal profile as a function of time, in accordance with various embodiments.

FIG. 6 shows a plot of the weighted total water profile 610 in millimetres as a function of time over a growing season, similar to that shown in FIGS. 4A and 4B. This temporal historical view of the behaviour of, for instance, a soil moisture sensor associated with a specific crop location may, in accordance with various embodiments, provide a measure of available water in the soil profile in order to determine various crop location-specific characteristics. For instance, knowledge of the level or height of water available in the column may allow for computation of water consumption (e.g. uptake by a crop) or and/or loss (e.g. drainage, evapotranspiration, etc.), or a rate thereof, temporally, such as in real-time, or every ten minutes, over a growing season. For example, curve 612 illustrates a computed water withdrawal in millimeters over the same time frame in ten-minute intervals. In this example, one may observe, for instance, that as water level 610 rises, a rise in water withdrawal 612 similarly rises soon thereafter. The characteristic behaviour of such rising and falling of water withdrawal, which may be specific to a particular crop location, may be received by an irrigation management platform to characterize the location to, for instance, understand, and therefore predict, how that crop location may behave in response to known changes in available water. This information may be used to, for instance, provide informed irrigation suggestions on a crop location-specific basis.

Figure 7:
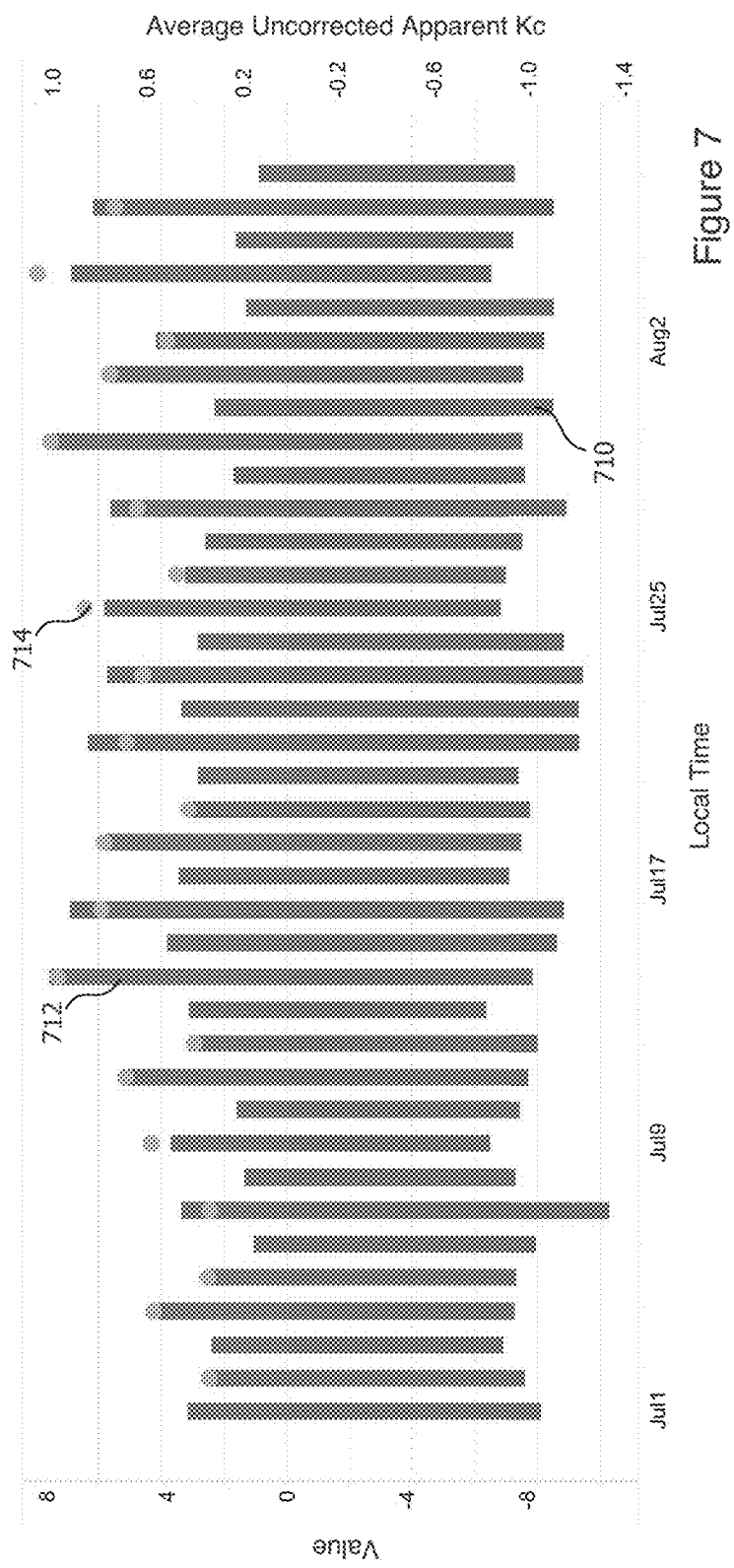
FIG. 7 is an exemplary plot illustrating predicted and actual water withdrawal, in accordance with some embodiments.

FIG. 7, in accordance with at least one embodiment, shows an illustrative plot of various forms of water withdrawal that may be measured, calculated, or inferred based on, for instance, soil moisture and/or available water measurements, for a particular crop location. In this example, bars 710 plot, on a daily basis, the amount of water in millimetres that is predicted to be lost due to evapotranspiration based on a generalized model for the type of crop at that location. Such estimates may be made, for instance, using a weather forecast and a general evapotranspiration model modified by a crop type-specific coefficient (e.g. a coefficient Kc of 0.3 for an almond tree after budbreak, a coefficient of 1.2 prior to harvest, or the like). Bars 712, on the other hand, correspond to actual water withdrawal accumulated each day at the specific crop location. In this example, the predicted water loss 710 overestimated the actual water loss 712 for this crop location for almost every day that is shown. As a result, a grower that is attempting to maintain a consistent available water level for that crop based on a generalized model specific to, for instance, the crop type grown at that location, may overwater that location at the expense of irrigation costs and labour. Further, by assuming an incorrect coefficient Kc for transforming a generalized model, optimal available water levels for a crop may not be attained upon irrigation, which may be harmful for a crop growing at that location, which may result in, for instance, lower crop yield or quality, or be detrimental to a various value metrics such as a ROI for the grower. Based on the actual water withdrawal 712 for a particular crop location, a grower may, in accordance with various embodiments, determine a more accurate apparent Kc (aKc) 714 specific to each crop location and water available that day. In accordance with various embodiments, an apparent crop location-specific aKc may be recalculated (e.g. every two days in FIG. 7) for up-to-date characterization of crop location behaviour with respect to water to better inform irrigation practices. Further, and in accordance with some embodiments, understanding such water consumption/loss 712 may allow for determination of a coefficient 714 correcting for a crop stage and/or crop status on a crop location-specific basis (e.g. in view of soil moisture, which may be a main contributor in variability of an apparent Kc), and/or on a daily basis in view of climatic factors (e.g. temperature, humidity, wind, sunlight, etc.) and/or predicted evapotranspiration factors. In accordance with some embodiments, an aKc value may comprise a ratio in turn comprising expected water withdrawal 710 and actual water withdrawal at a crop location over a designated time frame. In such examples, aKc values may contribute to improving irrigation prescriptions by, for instance, providing a more accurate and/or realistic coefficient by which to scale generalized irrigation models.

Accordingly, and in accordance with some embodiments, an aKc value, or apparent crop location characteristic, may comprise a ratio between the amount of water removed by plant transpiration or evaporation in a crop location, and a modeled reference evapotranspiration over a given time period. For example, an aKc value, in one embodiment, may be the ratio of the millimeters of water removed by evapotranspiration in the vicinity of a soil probe to that predicted by a commercial generalized model for a particular day. In other embodiments, an aKc may comprise a value that is relative to a particular sensor or sensor type (i.e. aKc may be relative). In some embodiments, aKc may be corrected or updated by actual amounts of water and/or irrigation sensed or inferred, and may serve as a means of understanding and/or characterizing actual crop water requirements. For instance, when water is applied at or near probes with precision irrigation systems (e.g. drippers), that water may not be evenly distributed through the entire crop area or portion thereof (e.g. an orchard floor). For example, when 5 mm of water is applied directly in an area near a probe, the probe may register an increase in soil moisture greater than 5 mm. Accordingly, aKc may serve as or comprise a correction factor applied to an inferred evapotranspiration rate in the crop location. For example, after the application of water, the probe may record a daily decrease in soil moisture as a result of evapotranspiration. That daily decrease may be proportional to a water demand that is related to the environmental conditions (e.g. ETo), and a hardship that the plant has to absorb water from the soil for the experienced environmental conditions. Upon normalization of water loss by the water demand related to environmental conditions, the resulting coefficient may, in accordance with some embodiments, be only proportional to the actual evapotranspiration of a crop or crop location for the given soil conditions.

Further, and in accordance with various embodiments, aKc may be representative of crop water stress. For example, in FIG. 7, when a grower performs an irrigation, perhaps in response to an apparent Kc decreasing below a threshold, apparent Kc may increase and subsequently decrease as soil moisture is depleted. Apparent Kc may then be expected to be at a maximum when a probe is in soil with a maximal moisture level, and at a minimum (e.g. near 0) when the soil approaches a permanent wilting point. It may further be expected that the transition from maximal to minimal aKc may be slower when an entire crop area (e.g. the entire orchard floor) has high moisture levels, and faster when the area has low moisture levels and the only moisture available is that delivered via the most recent irrigation.

Figure 8:
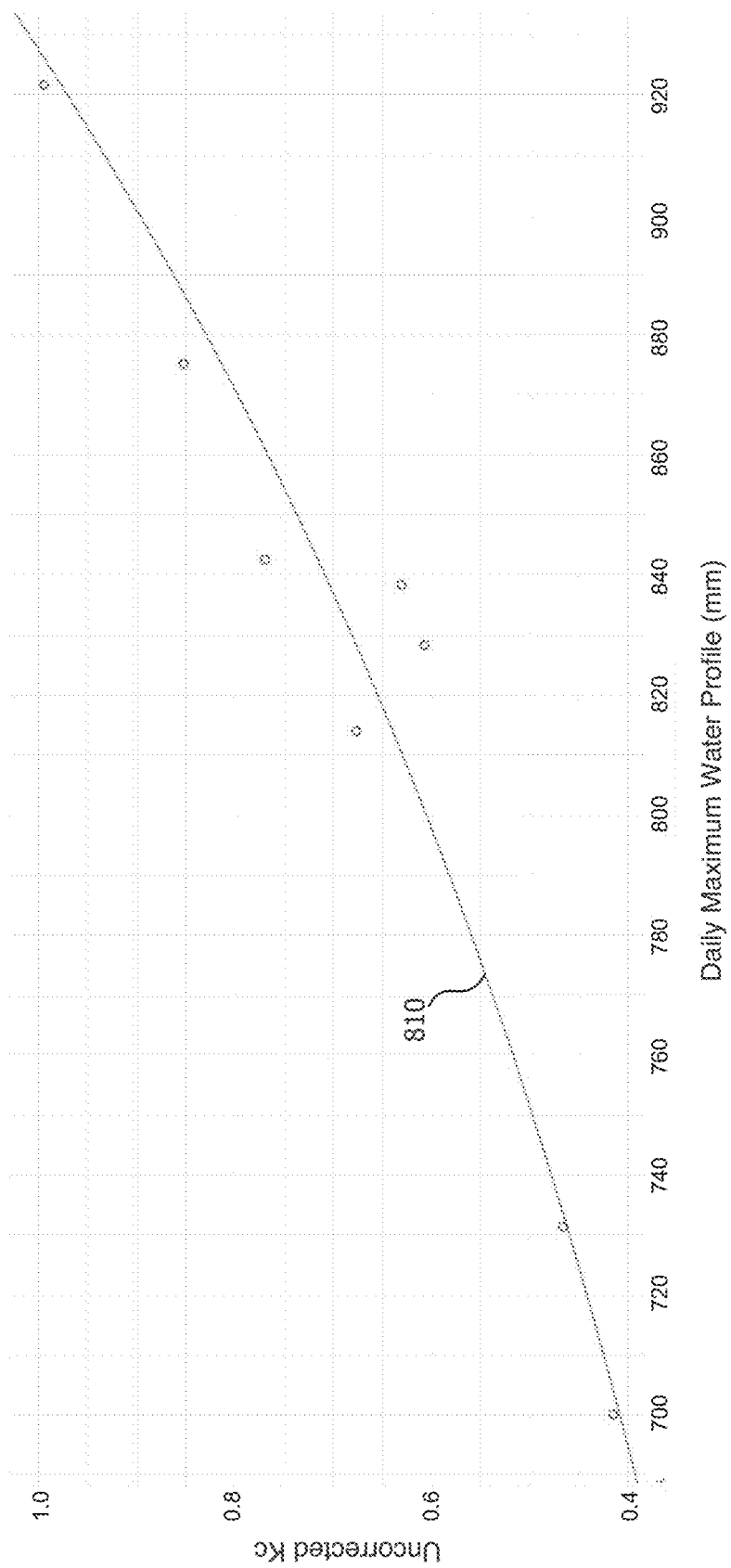
FIG. 8 is an exemplary plot illustrating a variance in a water withdrawal coefficient as a function of water profile height, in accordance with various embodiments.

Using, for instance, location-specific water consumption data 712 and location-specific aKc values 714 extracted therefrom, an irrigation management platform may further determine additional crop-location specific characteristics. For instance, FIG. 8 shows an illustrative plot of Kc values plotted as a function of the daily maximum in a water profile for a particular crop location for establishing a relationship for how a location-specific aKc value varies with available water. A fit 810 to such data may allow for extraction of further crop location-specific coefficients or correlations to characterize a crop location for, for instance, informing future crop irrigation practices.

Figure 9:
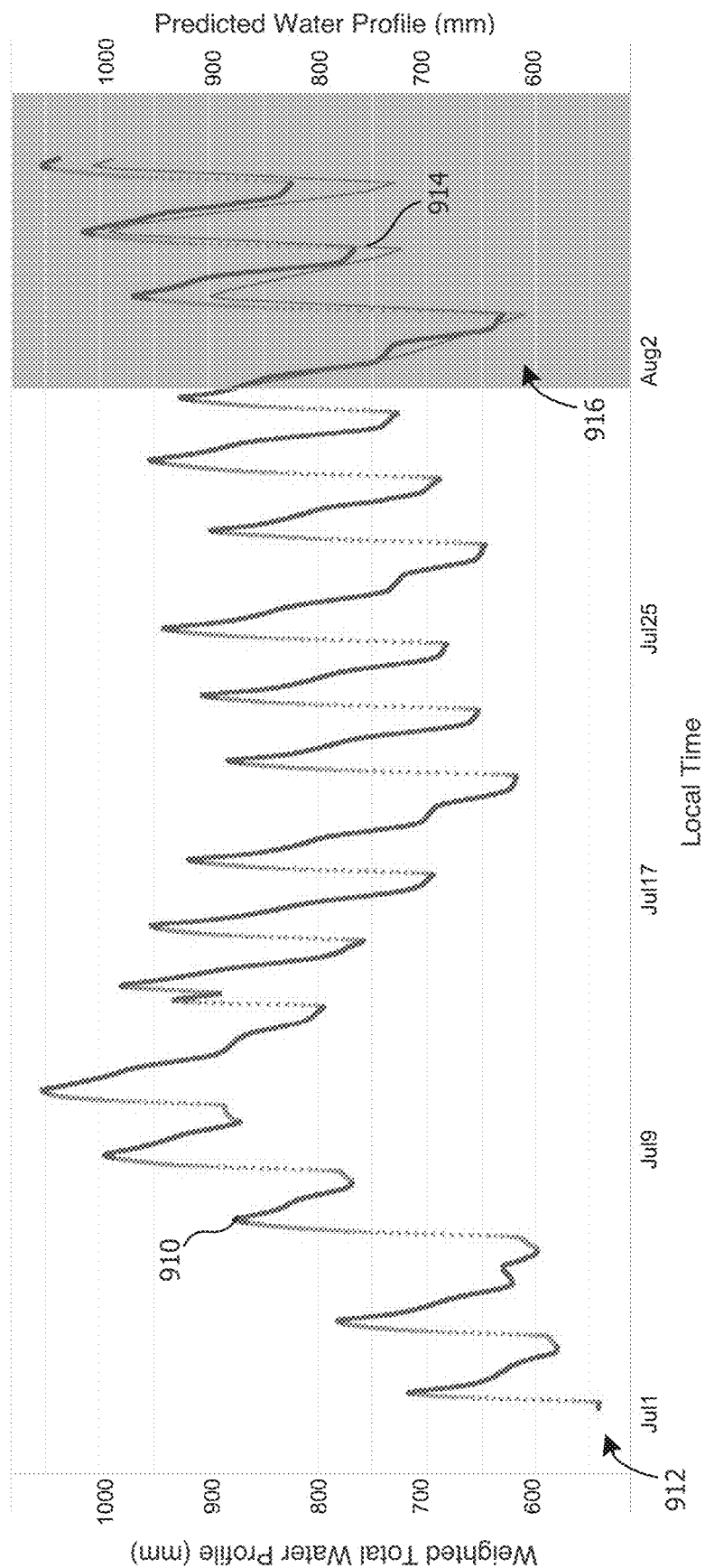
FIG. 9 is an exemplary plot illustrating a predicted water profile, in accordance with some embodiments.

In accordance with at least one embodiment, FIG. 9 illustrates how a crop irrigation management platform may use such correlations and specific crop location characteristics to improve irrigation practices based on characterized crop location behaviour. In this exemplary plot, the water profile 910 is monitored (e.g. via a soil moisture sensor) over the first period 912 of a growing season. An irrigation management platform may process such data, for instance by characterizing how available water in the soil at the crop location rises and then falls upon designated or measured irrigation applications, as described above, to develop a crop location-specific profile corresponding to that location. Using sensed and calculated crop location characteristics, the platform may then calculate, based on the stored location-specific characteristics and/or responses to irrigation applications, a predicted water profile 914 for a future time period 916. In this example, the line 914 predicts how much the water profile will rise in response to an application, as described, for instance, above with reference to FIG. 5. It may further predict how water will be absorbed or lost (and/or a rate thereof) due to various factors, as described, for instance, above with respect to FIGS. 6 and 7. As observed from the similarities between the measured 912 and predicted 914 water profiles, an irrigation management platform using crop location-specific parameters may provide an improved prediction of a crop location response to irrigation applications for improved crop management.

Various embodiments of the systems and methods herein disclosed relate to the improvement of crop irrigation practices through improved characterization of crop locations for more efficient irrigation applications. For example, one embodiment, illustrated in FIG. 10, relates to the provision of a user interface, such as a graphical user interface (GUI) 1000 on a smartphone application, web browser, or the like, that allows a grower to visualize, navigate, display, and/or toggle between information and datasets that are relevant to irrigation of a specific crop location. In this non-limiting example, the GUI 1000 comprises a first region 1010 that may display information related to, for instance, weather data, such as a temperature, wind, or amount of precipitation received on a daily basis. It may also display information related to historical or suggested water applications (e.g. 0.12" applied on September $3^{rd}$), estimated or measured evapotranspiration, and/or a water deficit for a particular crop location on, for instance, a per day time scale, or as cumulative or summarized data for a particular week of the growing season 1012. A second region 1014 may display graphical information related to, for instance, historical sensed soil moisture 1016 for the particular crop location. In accordance with various embodiments, sensed soil moisture readings may be projected into a future time scale, for instance to predict 1018 available water in the soil for the coming days, in view of a suggested or anticipated water application. Alternatively, or additionally, a GUI 1000 may display additional crop locations characteristics, such as a field capacity 1022 or permanent wilting point 1024 as related to available water in a particular crop location.

In accordance with various embodiments, a grower may attempt to maintain an available water level in a crop location, whether historically 1016 or in the future 1018, close to a target value, within a range of values, or above or below a target value. For instance, a grower may wish to maintain an available water level in a crop location above a maximum allowable depletion (MAD) level 1026, wherein a value below the MAD line 1026 may cause damage to a particular crop or crop type. Conversely, a grower may not wish for soil moisture or available water to be significantly in excess of the MAD line, as such may require or be a result of overwatering a crop location, at monetary and time expense to the grower. Accordingly, and in accordance with various embodiments, a grower may use an irrigation management platform to maintain a soil water availability, both over a growing season in real-time 1016 and in the future 1018, at a level just above or close to a MAD line 1026. This may be enabled, for instance, with a high degree of location-specific crop and/or soil characterization in view of well understood soil water availability behaviour upon irrigation regimes, as described above with respect to FIGS. 4 to 9. That is, upon appropriate characterization of a particular crop location, a grower may better predict how future soil water availability 1018 will behave in response to, for instance, an irrigation event, or how water availability will decay in advance thereof.

Figure 10:
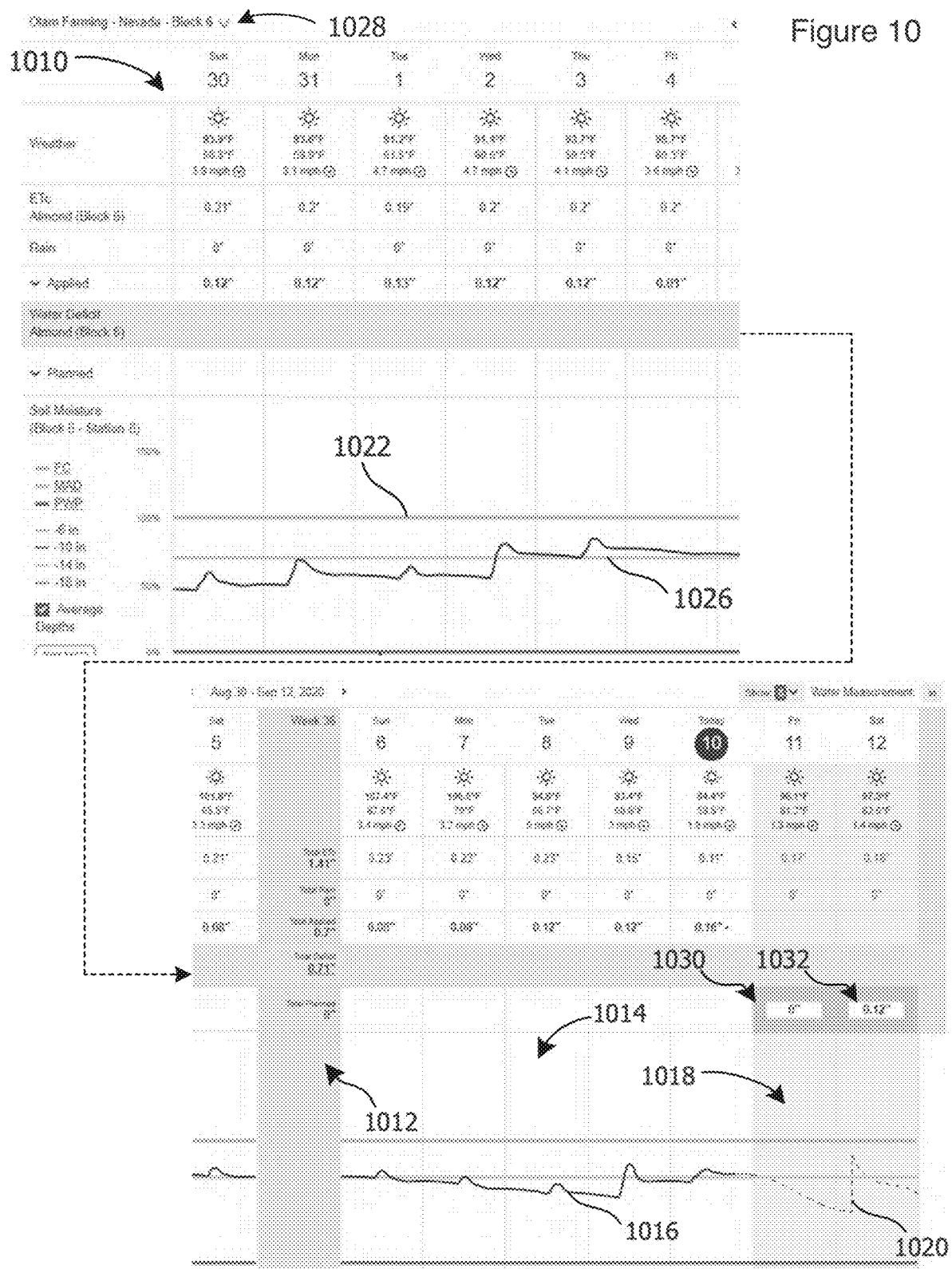
FIG. 10 is a screenshot of an exemplary user interface of a digital crop management platform, in accordance with various embodiments.

For example, and in accordance with various embodiments, an irrigation management platform 1000 may allow a grower to simulate one or more future crop location metrics, such as a future soil water availability 1018, in view of one or more planned irrigations 1030 or 1032. In FIG. 10, planned irrigations applications 1030 and 1032 for September $11^{th}$ and $12^{th}$, respectively, are 0" (no irrigation) and 0.12". The skilled artisan will appreciate, however, that such irrigation applications may further relate to a volume of water, a duration of an irrigation application, or the like, without departing from the general scope and nature of the disclosure.

In this example, as there are no watering events (e.g. irrigation applications or rainfall) for September $11^{th}$, water availability is predicted 1018 to fall during that calendar day. Having well characterized the specific crop location, however, the irrigation management platform may accurately predict the extent and time over which water available in the soil at the crop location will increase 1020 following the planned irrigation 1032 of 0.12". In this example, the available water in the soil at the crop location drops below the MAD line 1026 in advance of the planned irrigation 1032. In seeing this simulated prediction of low water availability, the grower may, in accordance with some embodiments, plan an alternative irrigation schedule, perhaps by planning an irrigation 1030 on September $11^{th}$ (e.g. plan to apply 0.11" of water to the soil at the crop location using data entry field 1030) so to view a simulated future water availability 1018 and maintain same above a designated threshold, such as above the MAD line 1026. The grower may further modify other future planned irrigations, for instance via data form 1032, to further simulate 1018 future water metrics. Accordingly, the grower may thereby apply appropriate amounts of water 1030 and 1032 so as to, for instance, remain above the MAD line 1026, while efficiently managing water, time, and cost.

Further, and in accordance with various embodiments, the platform 1000 itself may, in view of a target water metric, such as a fixed or variable MAD line 1026, automatically plan and/or implement irrigation applications (e.g. irrigations 1030 and 1032) so to maintain the target or target range. For instance, and in accordance with various embodiments, an automated platform 1000, may simulate irrigations 1030 and 1032 without grower intervention so to maintain future soil moisture 1018 above MAD line 1026, and apply appropriate amounts of water via one or more automated irrigation systems. Further, the platform may plan irrigation applications 1030 and 1032 in view of a ROI of such applications. For instance, while one embodiment relates to a system automatically implementing continuous irrigations or multiple irrigations per day so to maintain soil moisture at the crop location just above the MAD line 1026, such constant or continuous water applications may be costly to a grower in consideration of electricity costs or availability of irrigation systems (e.g. when an irrigation system is shared between crop locations). Accordingly, the platform 1000 may plan and implement single daily watering events to maintain future soil moisture within a target range (or above or below a target threshold) so to provide an optimal ROI in view of practical irrigation constraints. In some embodiments, the platform may automatically determine such a target. In other embodiments, a grower may input a preferred target or outcome, and the platform may generate a schedule to achieve said outcome.

In accordance with some embodiments, the platform or GUI 1000 may enable a grower to view, simulate, and or plan irrigation timing, durations, or amounts across any crop location of interest, for instance via toggling 1028 between crop locations associated with the grower. A grower may, for instance, view different application suggestions 1030 and 1032 across locations to plan (e.g. simulate) an irrigation regime across several or all crop locations on a farm or field. This may enable, for instance, the grower to simulate various application regimens and associated predicted sensor behaviour to strategize applications, or choose between various irrigation application schedules.

Figure 11A:
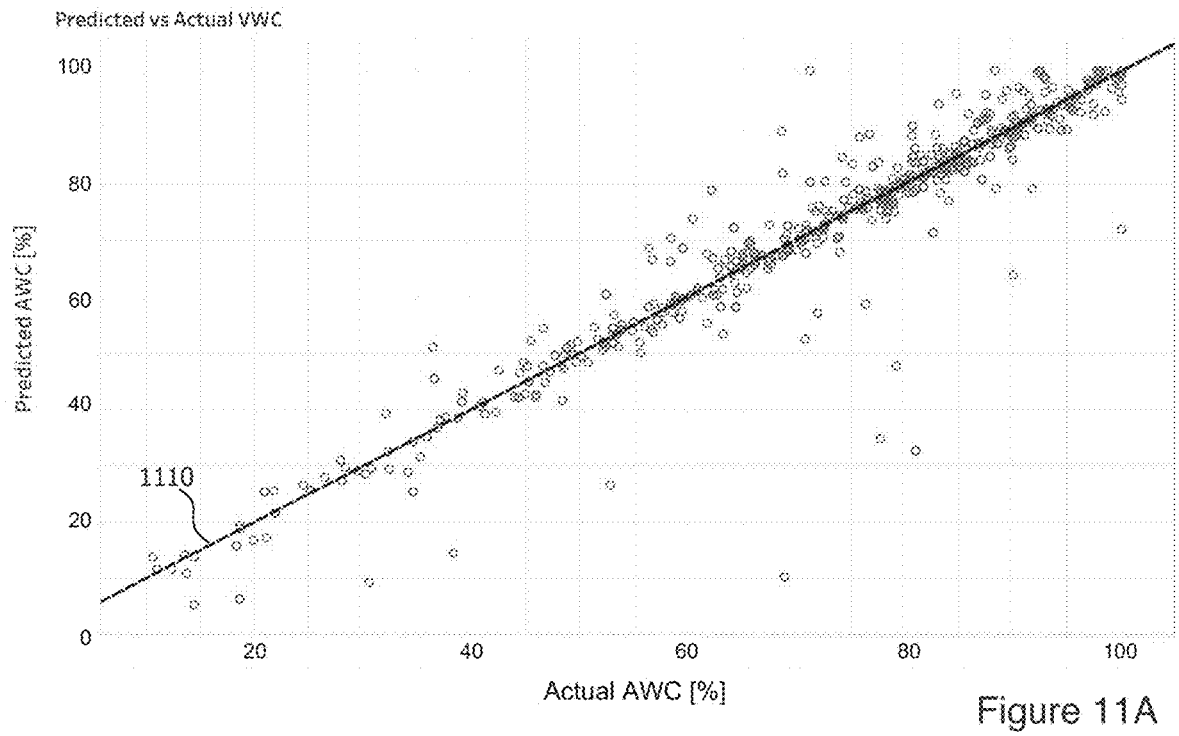
FIGS. 11A and 11B are exemplary plots for comparing predicted water availability and actual water availability, in accordance with various embodiments.
Figure 11B:
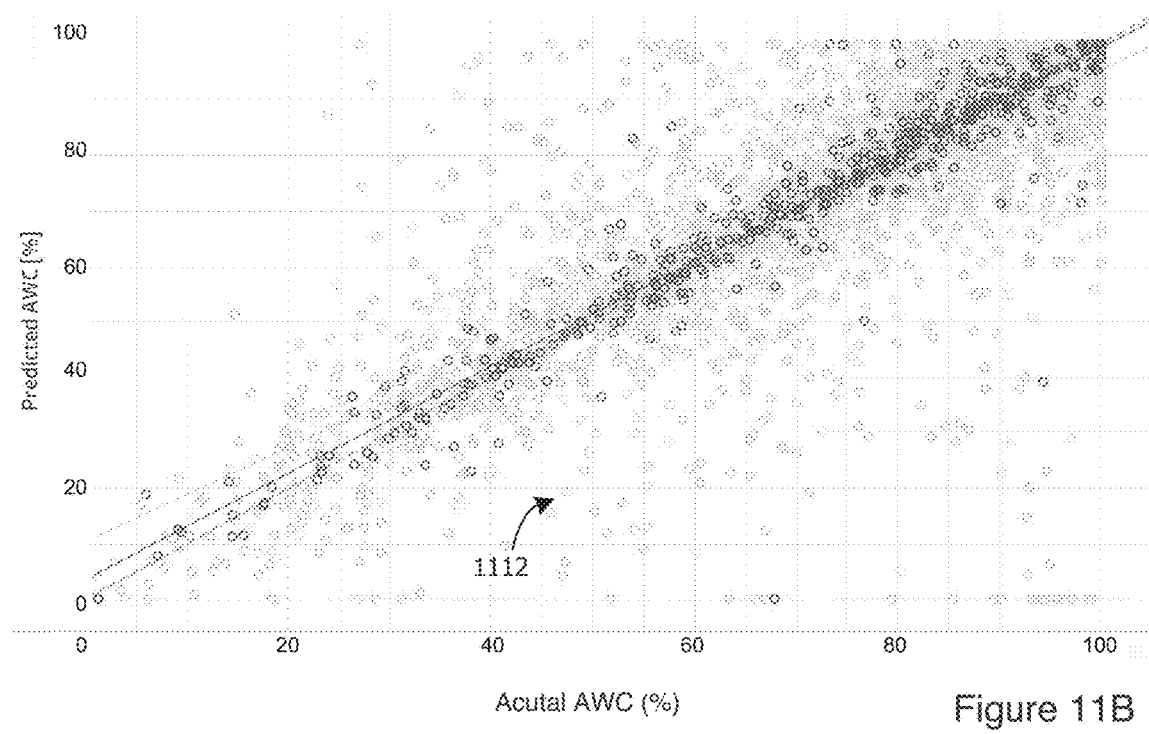

In accordance with various embodiments, FIGS. 11A and 11B are illustrative plots showing predicted (e.g. simulated) available water content, based on crop location-specific models, compared to the actual value as sensed at those crop locations. As shown in FIG. 11A, the predicted values are in good agreement with actual values when the model is used to predict available water one day in advance, as highlighted be the clustering or data points around the fit line 1110. Similar data may be plotted and/or correlated for this and/or other time windows (e.g. 2 days, one week, etc.) in order to accurately predict crop location behaviour and thereby maintain, for instance, available water content above a MAD line, as described above. FIG. 11B shows one such example, in accordance with some embodiments, where data points shown as dark circles show values predicted for the crop location one day in advance, while lighter circles 1112 show predicted versus actual values for available water content predicted 2 to 7 days in advance. Further, such correlations may be updated at a desired frequency upon acquisition of sensed data by an irrigation management platform, such as the acquisition of soil moisture readings before, during, and after a new irrigation. Accordingly, models, and therefore predicted available water levels and suggested water applications, may be iteratively improved throughout a growing season or across growing seasons. Moreover, while predictions of available water may be performed several days in advance, as shown in FIG. 11B, an autonomous model, in accordance with various embodiments, may frequently or continuously update predictions, for instance to reduce prediction error and allow for more effective use. For instance, while a model may predict available water 3 days in the future to suggest an irrigation application 1 day in the future, it may update the 3-day prediction daily in order to minimize error and offer improved daily suggestions. This may offer improved irrigation practices compared to a human-generated irrigation schedule, which may comprise planning an entire week's water applications once per week.

Figure 12:
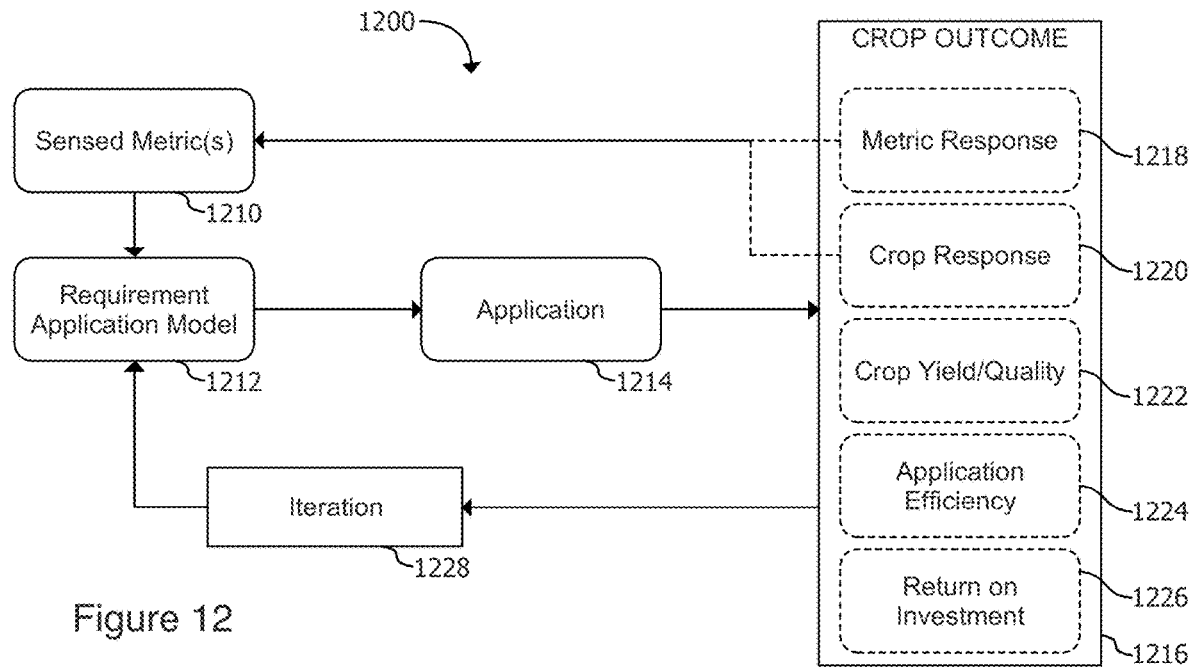
FIG. 12 is a schematic diagram of an exemplary process for improving irrigation management practices based on crop outcomes, in accordance with various embodiments.

While the embodiments described above relate to characterizing crop locations on a site-by-site basis for prescribing irrigation applications tailored to the specific properties and/or requirements of each crop location, various embodiments relate to informing irrigation models based on crop outcomes. FIG. 12 schematically shows one such exemplary process 1200. In this example, a metric 1210 (e.g. soil moisture, available water) is sensed at a particular crop location, which is received by an irrigation management platform to, based on an irrigation model 1212, prescribe an irrigation application 1214, as described above. Following irrigation application(s), a grower or sensor associated with the crop location may observe various crop outcomes 1216. For example, a soil moisture sensor may measure response 1218 in the measured metric to the application (e.g. observe how soil moisture changes upon irrigation). Alternatively, or additionally, a crop response 1220 may be reported, such as a dendrometer reading related to how a crop's stress level changes upon irrigation. Further, harvest data, such as a crop yield, quality, or grade 1222, an efficiency of irrigation applications 1224 (e.g. how much a value of a crop was increased relative to a cost of the irrigation regimen, or a relative amount of materials that were effectively deposited in a crop location), or an ROI 1226, may be recorded for analysis by an irrigation management platform. Using such crop outcome data 1216, the management platform may assess, for instance, whether or not a frequency or amount of irrigation was worthwhile for a grower, and/or whether or not maintaining certain levels of sensed metrics 1210 is warranted for a grower in view of associated costs and/or monetary return on crop sale. A platform may use such data and analysis to then iterate 1228 over growing seasons to update an irrigation model 1212 for improved irrigation practices in future growing seasons.

Figure 13:
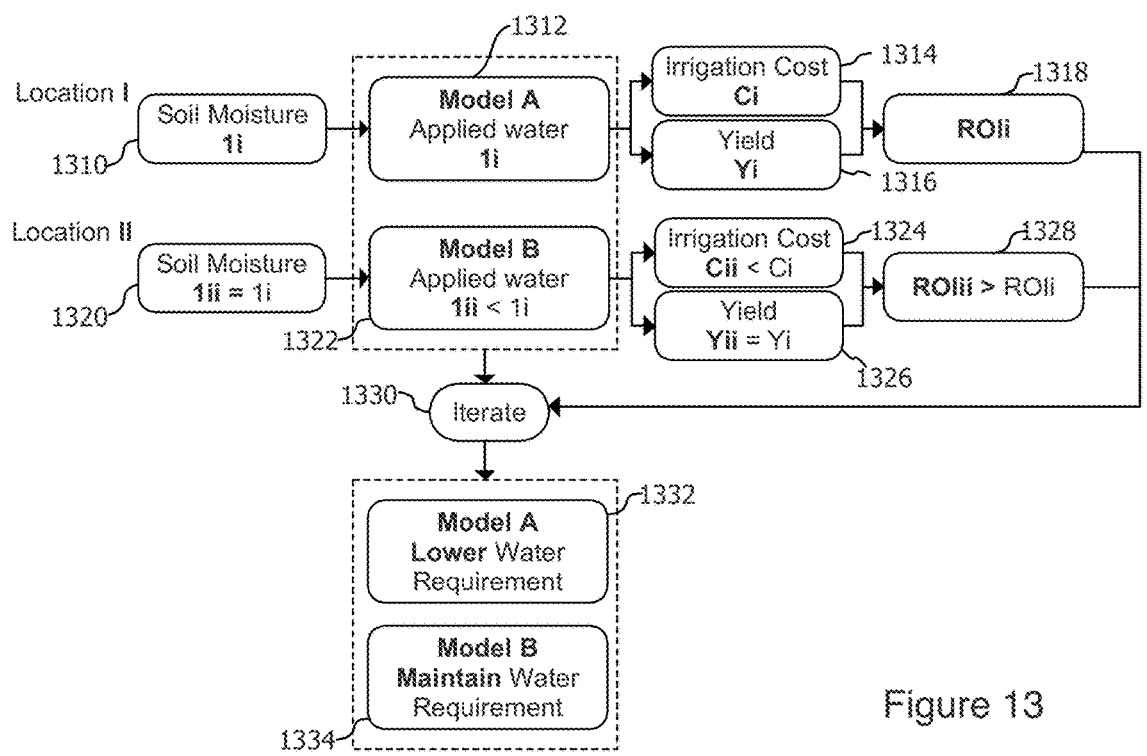
FIG. 13 is a schematic diagram of an exemplary process illustrating iterative improvement of crop management models based on crop outcomes, in accordance with various embodiments.

In accordance with another embodiment, such crop outcome data may be analyzed by an irrigation management platform across multiple crop locations. For instance, FIG. 13 schematically shows an exemplary process by which a platform may sense crop location metrics across two growing sites Location I and Location II. In this example, soil moisture 1310 is sensed at Location I to determine an available water at that crop location for input into an irrigation model 1312. Upon irrigation, an amount of water applied may be sensed and automatically received by the platform to determine a cost associated with the irrigation regimen, such as the cost 1314 of water and electricity used over the course of the growing season. Upon sale of crops, the platform may receive information related to, for instance, yield 1316 of the crop, or grades of crop and the associated monetary return 1316 upon sale. The platform may then calculate a ROI 1318 for that particular irrigation regimen at that crop location.

In parallel, the grower may sense soil moisture 1320 at the second crop location. In this example, the second crop location has a different irrigation model 1322, such as if, for instance, previous returns on a crop in that location initiated an update on the previous model. Irrigation costs 1324 and crop yield 1326 may similarly be used by the platform to determine the location-specific ROI 1328. In this example, the model 1322 for the second location prescribed less irrigation for Location I than Location II, resulting in lower irrigation cost 1324, while still maintaining the same yield 1326 as that of Location I. As a result, the ROI 1328 for Location II is higher than that of Location I. Accordingly, the platform may then analyze such crop outcome data to determine a correlation between sensed soil moisture levels 1310 and 1320 to iteratively update 1330 models associated with each location. In this example, the platform, in the following growing season, may update the model 1332 for the first location to prescribe less water during irrigation, while maintaining the model 1334 for the second location, based on, for instance, knowledge that a lower level of available water in the soil does not result in a loss in ROI.

Figure 14:
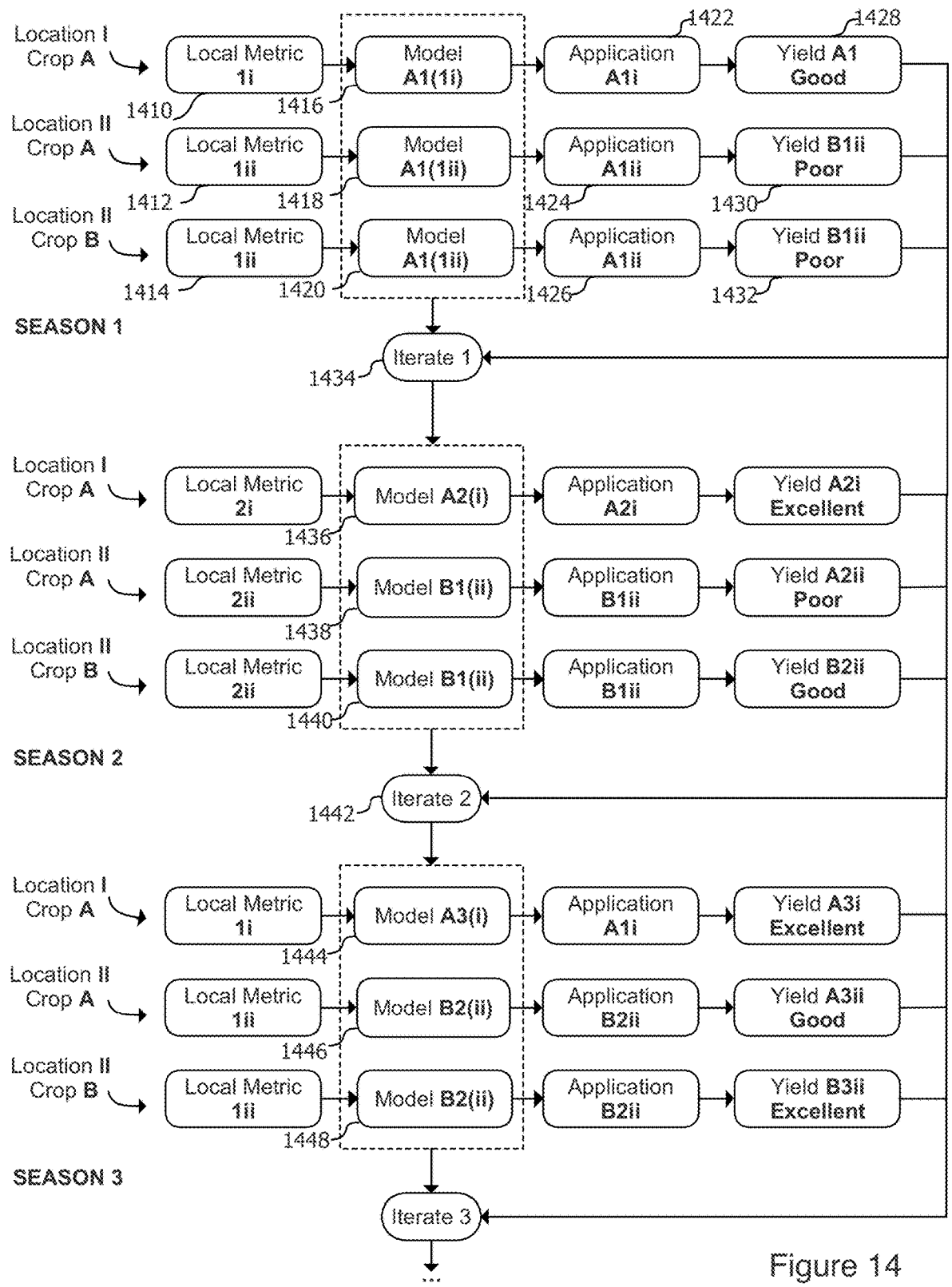
FIG. 14 is a schematic diagram of an exemplary process illustrating iterative improvement of crop management models based on crop outcomes across growing seasons, in accordance with various embodiments.

A similar process is schematically represented in FIG. 14, this time illustrating how a process may be employed for different crops and locations. In a first growing season, requirement metrics such as soil moisture may be sensed 1410 for a first crop type (Crop A) at a first location (Location I), sensed 1412 for that same crop type at a second location (Location II), and sensed 1414 for a second crop type (Crop B) at the second location. In this example, an irrigation management platform, in the first season, may employ the same irrigation model 1416, 1418, and 1420 for each crop and location. Each respective model (although beginning as the same prescriptive model, for instance in a situation where the grower applied a generalized commercial irrigation model) may, based on the metrics sensed at each location, prescribe respective irrigation applications 1422, 1424, and 1416. In this example, as Location II comprises two crop types, the same irrigation application is applied to both crops. The platform may then receive, for instance at the end of a growing season, input related to how each crop performed at each location. In this example, the yield 1428 for Crop A in Location I is be deemed as adequate, as based on, for instance, an ROI, while the yield 1430 of Crop A at Location II and the yield 1432 for Crop B and Location II were poor, for instance if the irrigation applications 1424 and 1426 were inadequate for those crops based on soil drainage characteristics of the crop location.

An irrigation management platform may analyze the irrigation application data and crop outcome data from the first season in view of the locally sensed metrics to determine any correlations between the datasets. The platform may use these correlations to update 1434 each model. In the following growing season, the model 1436 for Crop A at Location I may be tuned or improved for that crop location. In this example, the models 1418 and 1420 were deemed to have performed poorly, second season models 1438 and 1440 may be more significantly adjusted. For instance, the model for Location II may be one that corresponds to Crop B, rather than a Crop A model from the previous season. In this example, the yields at Location I for Crop A and Location II for Crop be were improved, and any data acquired with respect to sensed metrics, irrigation applications, and yields may be processed by the irrigation management platform to perform a second iteration 1442 of irrigation model improvement for the next year. This may be repeated for the third season, with sensed data being continuously or periodically acquired for input into improved crop models 1444, 1446, and 1448 for the respective crops and locations, with crop outcomes being improved upon each iteration.

Similar embodiments relate to sensing crop location-specific data across many crop locations (e.g. thousands of crop locations).

While the abovementioned embodiments relate to iterative improvement of irrigation models for recommending location-specific irrigation applications, various embodiments relate to the use of similar data acquired across many crop locations to improve estimates of, for instance, target values of a crop characteristic over a growing season. For instance, conventional models may suggest that a particular crop be grown in a soil maintained with an available water value that is constant throughout a growing season (e.g. maintaining available water above a MAD line of 40% for the entire season). However, such recommendations may not be indicative of what is actually optimal for a particular crop, or for a crop growing in a particular soil type. For example, irrigation may be optimized from an economic point of view by maintaining, for example, a high available water in soil for portions of the growing season, while lower values may be maintained later on, saving a grower money on irrigation applications, without sacrificing a crop quality, yield, grade, and/or return on investment.

For instance, and in accordance with some embodiments, historical irrigation data, such as that shown in FIG. 19, may be analyzed by a crop management platform to evaluate crop yield for different crop locations in view of time-dependent historical water applications or available water levels in soil over the course of the growing season. In this example, eight different crop locations (e.g. eight different groups of trees) subjected to eight different irrigation treatments are compared with a control group (e.g. a control group of trees) that was well watered year-round. Different irrigation treatments may relate to, for instance, and without limitation, maintaining a threshold maximum allowable depletion (MAD) of available water content in the soil. In the example of FIG. 19, the control group was irrigated in accordance with maintaining 80% available water content in the soil year-round, while trees in groups 1 to 8 were subjected to deficit irrigation (i.e. allowing greater water depletion) at different times throughout the growing season. An irrigation management platform may utilize such data from across many (e.g. thousands) crop locations to assess the impact of, for instance, various crop stress levels related to soil moisture depletion, as a function of time, to determine more efficient or effective irrigation regimes. Such data may also, in accordance with some embodiments, be used to modify or calibrate irrigation models to, for example, adjust an available water target in the soil. For instance, irrigation regimes that vary in water application and/or availability over time may show differential impact regarding the impact of excesses and/or reduction in overall crop yield. An irrigation management platform may determine that maintaining available water above a variable threshold, or within a variable range, may provide an improved ROI.

In accordance with some embodiments, the platform may determine, for instance, that a target crop characteristic, such as a MAD line, is more optimally varied over a growing season. For example, a MAD line comprising lower soil moisture targets later in a growing season may be more optimal than a commercial model or conventional farming practices having a constant MAD line, for instance if the impact on the ultimate crop value of maintaining a high amount of soil moisture later in the season is minimal. Targeting a lower MAD level may thus save on watering costs while maintaining overall crop value. Accordingly, and in accordance with some embodiments, analysis of data such as that of FIG. 19 may be further employed to update a target water profile. For instance, crop locations exhibiting the highest ROI over a growing season may be selected, and their respective sensed historical soil moisture profiles used to contribute to an updated target water profile for subsequent growing seasons. For example, Treatments 1, 3, and 4 of FIG. 19 may be determined, based on the crop yields and the costs associated with their respective irrigation treatments, to produce the highest ROIs for a grower. An irrigation management platform, in accordance with some embodiments, may generate, using the observed available water profiles for those locations, a modified target MAD line having a lower threshold available water content in the soil during the earlier months of the growing season. Further, and in accordance with some embodiments, similarly characterized crops or crop locations, within the same farm, across different farms, growing regions, and/or across growing seasons, may contribute to and/or benefit from such updated target profiles to improve an ROI on crop management.

Figure 15:
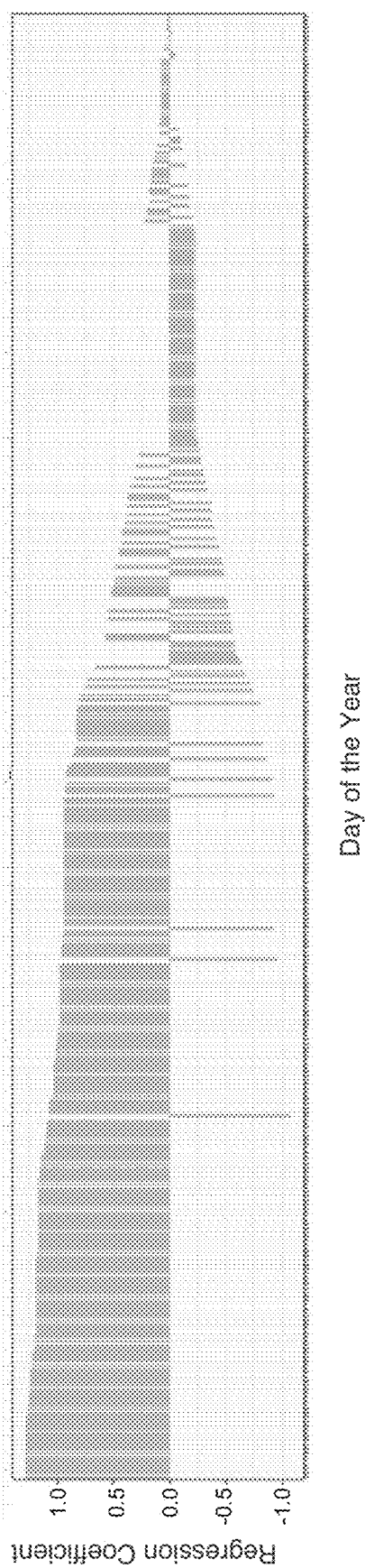
FIG. 15 is an exemplary plot of regression coefficients as a function of time for improving crop location-specific irrigation practices, in accordance with various embodiments.

FIG. 15 is an illustrative plot, in accordance with some embodiments, showing historically derived irrigation patterns. Using such data, an irrigation management platform may employ, for instance, machine learning or other analysis processes, to assess, at a commercial scale, the impacts of soil moisture and/or water applied at many crop locations, and how such data relates spatially to historical variations in yield production and/or ROI.

Figure 16:
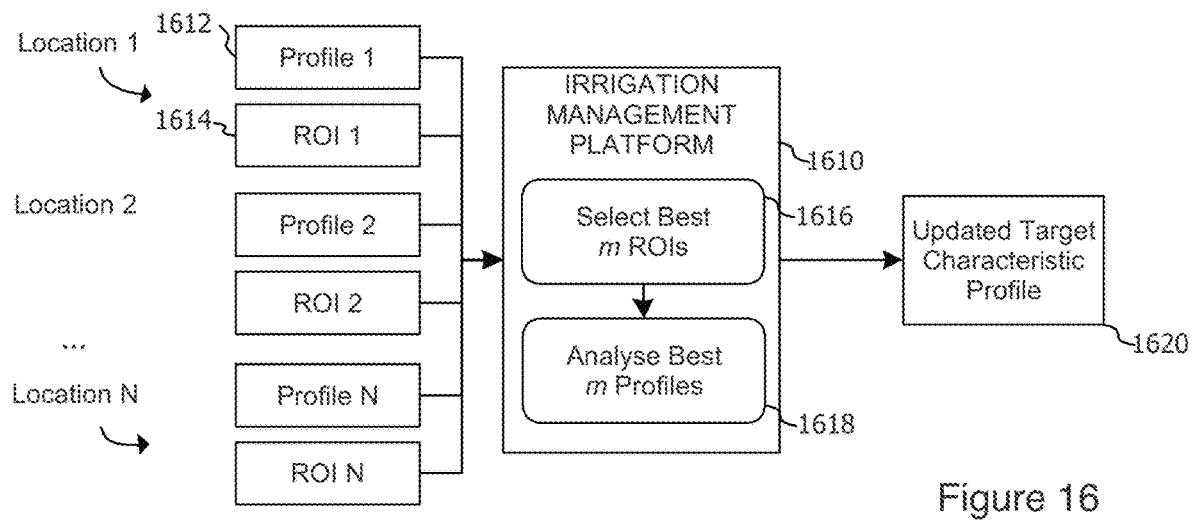
FIG. 16 is a schematic diagram of an exemplary process for improving soil metric targets based on analysis of sensed soil metrics and crop outcomes, in accordance with various embodiments.

For instance, and in accordance with some embodiments, FIG. 16 shows an exemplary process by which data from many crop locations may be processed by an irrigation management platform 1610 to provide improved target crop characteristics, such as an available water profile in soil. In this example, N crop locations (e.g. thousands of crop locations from many growers, farms, or fields) report on sensed metrics 1612, such as available water over the course of a growing season. For example, a profile 1612 may comprise soil moisture readings such as that shown in FIG. 4A or 4B. Such profiles may be analyzed in association with respective ROIs 1614. The irrigation management platform, having received such data from N locations, may then analyze the data to, for instance, group locations based on various parameters, and determine the m crop locations 1616 that exhibited the highest ROI. For example, the platform 1610 may receive data from 1000 locations, and of those 1000 locations, 100 were related to a particular crop in a particular soil type. The platform may then select the 10 best ROIs 1616 for subsequent analysis of the soil moisture profiles 1618. Any correlations between these best soil moisture profiles 1618 may then be used to update a target characteristic profile 1620 for subsequent growing seasons. For example, it may determine that a flat MAD line is sub-optimal, as the 10 best crop locations exhibited high available water levels at the start of the season and low levels at the end of the season. Accordingly, the target available water for a particular crop type in that soil type will be prescribed irrigation recommendations that follow the updated MAD line 1620 from the analyzed profiles.

Figure 17:
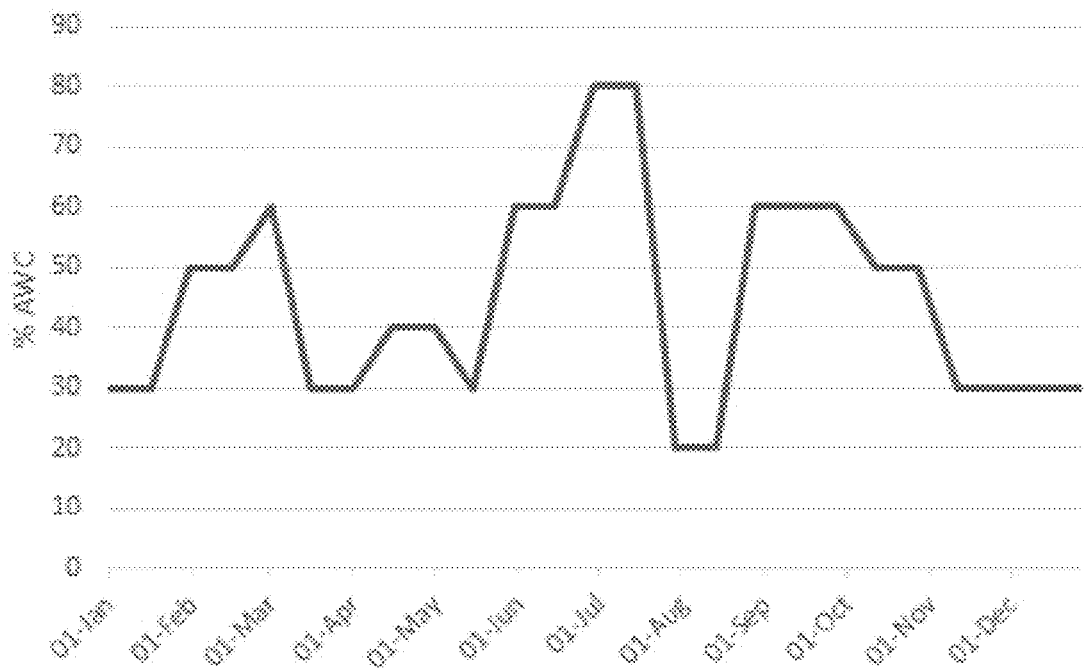
FIG. 17 is an exemplary plot of an improved crop requirement target profile, in accordance with various embodiments.

FIG. 17 shows an exemplary plot of an available water content percentage that may be determined by an irrigation management platform to be optimal based on analysis of many crop locations from the previous growing season. In this example, rather than being flat (e.g. a grower targeting to have available water above and near 40% for the entire growing season), the target MAD line may vary over the course of the growing season to provide, for instance, an optimized ROI. In some embodiments, as an alternative to the values displayed in FIG. 17, systems and methods disclosed herein may provide recommendations on fractions of crop water demand (ETc) needed to be applied to optimize yield; in other cases, such as is shown in FIG. 17, a recommendation of soil moisture (% AWC) at various times during the growing season will be provided. In such embodiments, instead of a target MAD for optimal crop outcomes, embodiments hereof may use calibration resulting from analysis of many crop locations from prior growing seasons that is based on percentages of ETc, which will result in an output of the model being percentages of ETc; accordingly, instead of a target MAD line, as shown in FIG. 17, a similar target over time for ETc may be presented. In such embodiments, percentages of ETc multiplied by the ETc of a given crop, which is in some cases corrected for weather and/or precipitation, will provide recommendations in in amounts of water (e.g. in mm). Such recommendations will be then allocated by the model to certain irrigation events on certain days that will achieve the maximum or optimal level of soil moisture over lime. In some embodiments, the provided recommendations will remain expresses as fractions of ETc, or they may be converted into values of soil moisture (% AWC) through a pre-existing empirical relationship. In such embodiments, the y-axis of FIG. 17 would, for example, be replaced with "% of crop water demands", "% of crop evapotranspiration (ETc)" or similar.

Figure 18:
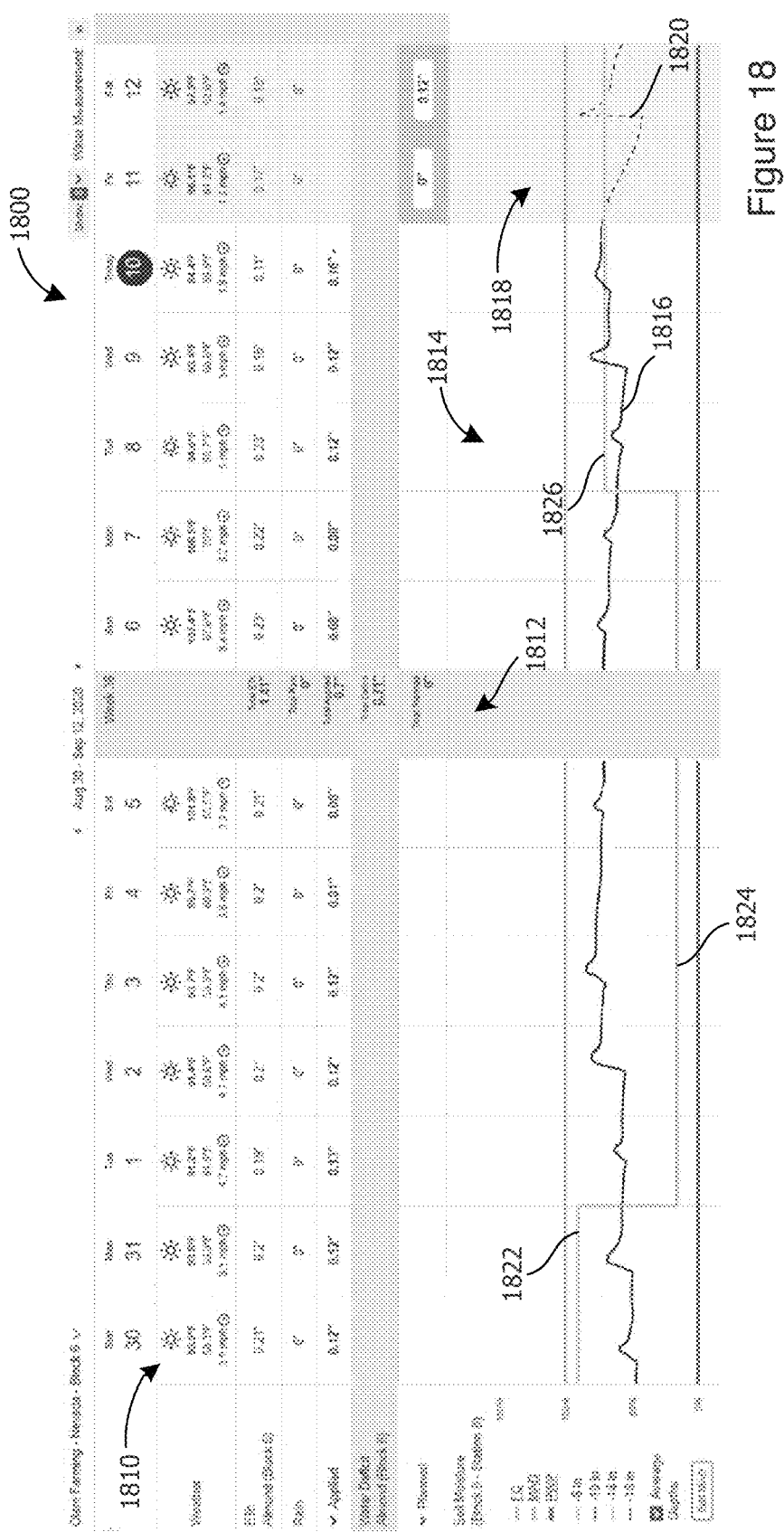
FIG. 18 is a screenshot of an exemplary user interface of a digital crop management platform having an improved crop requirement target profile, in accordance with various embodiments.

In accordance with various embodiments, FIG. 18 illustrates a GUI application for use by a grower to provide an optimal available water in soil at a crop location. Similar to FIG. 10, the GUI 1800 may display daily 1810 or weekly 1812 weather and historical water data, as well as plots 1814 for real-time, near-real-time, or periodically sensed available water data 1816. In this example, historical data 1816 specific to this crop location may be analyzed, as described above, to provide accurate predicted water levels over a future time window 1818. In this example, rather than having a flat MAD line as a target characteristic, the target MAD line, over the time window shown in the plot 1814, was at a high level 1822, before dropping to a lower level 1824. Based on, for instance, previous data collected and analyzed from many crop locations, the platform may then recommend that the MAD line be raised to level 1826. In this embodiment, the grower may view that in the next two days 1818, the MAD line remains at level 1826, and she may then view potential or suggested irrigation applications 1820 to determine if, for instance, the measured available water 1816 will be acceptable close or above the MAD line level 1826.

In accordance with various embodiments, the platform, having analyzed historical crop location-specific data, may accurately predict crop location characteristics for improved control over available water 1816. Further, an improved target characteristic that varies as a function of time over the growing season may provide an improved or optimal ROI for that crop location. As such, various embodiments relate to a platform that both provides an improved target characteristic profile having, for instance, various target levels 1822, 1824, and 1826, as well as an improved means of achieving target metrics 1816 via improved crop location-specific predictions.

Figure 20:
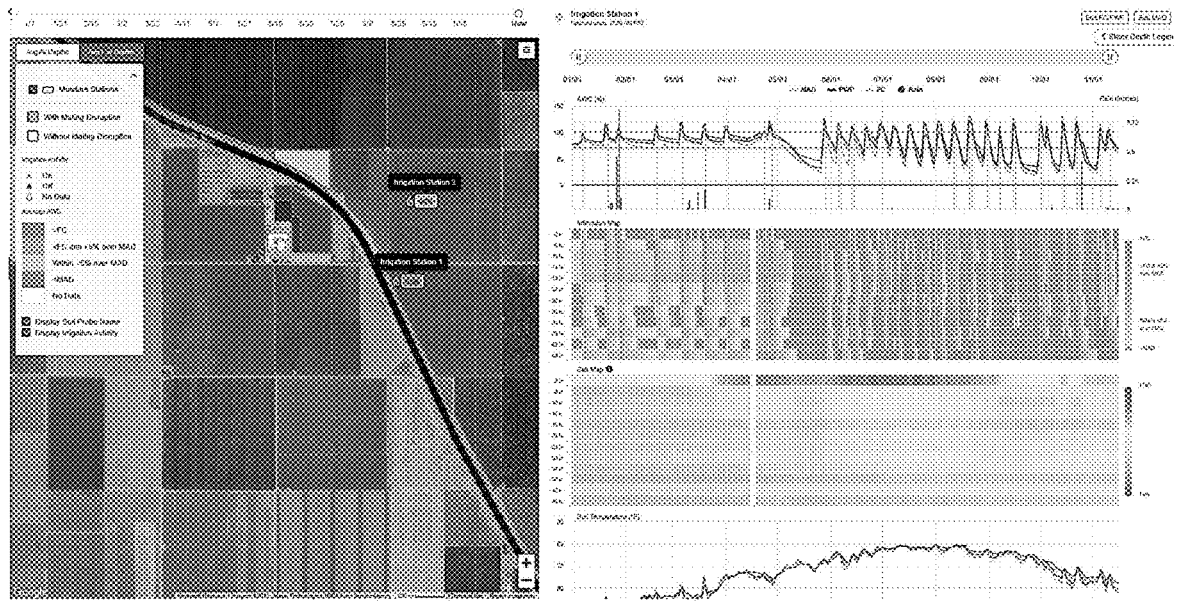
FIG. 20 is an exemplary display screen in accordance with one embodiment showing various soil characteristics in association with a crop growing area view aligned by date.
Figure 21:
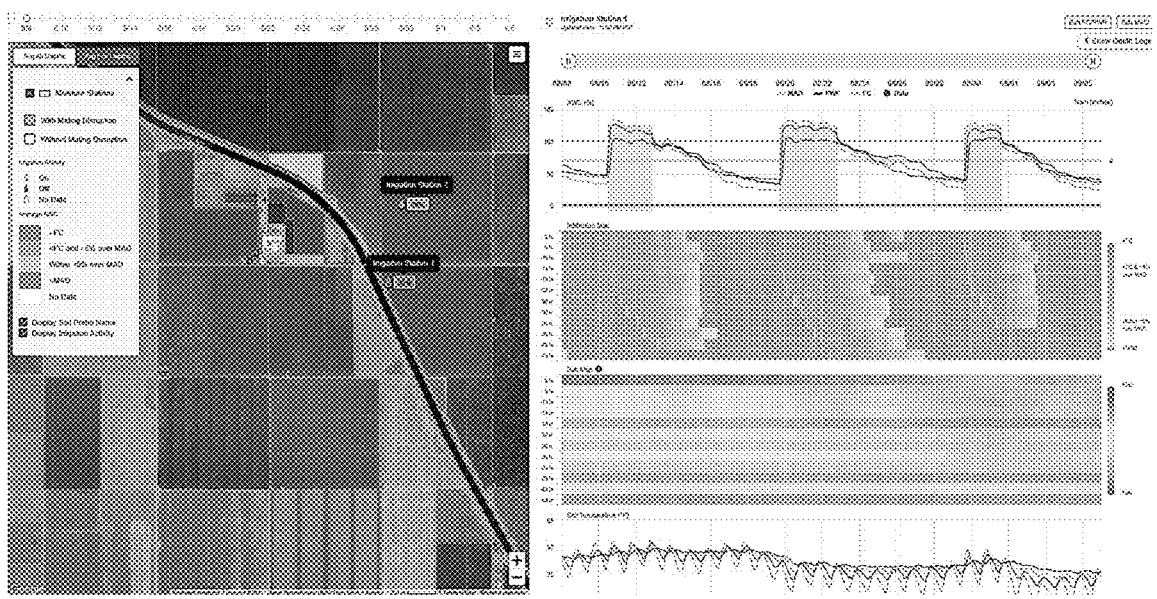
FIG. 21 is an exemplary display screen in accordance with one embodiment showing various soil characteristics in association with a crop growing area view aligned by date.

FIGS. 20 and 21 provide a display of sensed measurements from the network-interfacing soil moisture sensors, the data that is generated therefrom in accordance with the disclosures hereof, as well as data collected from—and/or derived from—other types of sensors. In FIGS. 20 and 21, the displayed information is aligned by date and associated with the location as selected in the mapping portion. As such, a user can easily select a location within a crop growing area and view some or all of the values determined in accordance with the disclosures hereof, as well as other information (e.g. soil temperature and soil salinity), over time where the graphical displays are aligned on the time portions thereof; at a glance the displayed values on a given day or point in the growing season can be compared, as can the trends associated with each such values over the same time frames.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A location-specific irrigation management system for predicting crop-realizable water in a crop location, the location-specific irrigation management system comprising:
    a network-interfacing sensor configured to sense over time and communicate over a network a soil moisture value at the crop location associated with said network-interfacing sensor;
    a network communications device configured to receive, over said network and in relation to the crop location, said soil moisture value and an irrigation signal indicative of an irrigation event;
    a digital data storage component for storing said soil moisture value and said irrigation signal over time and in association with the crop location; and
    a digital data processor operable to calculate, at least in part based on said stored soil moisture value and said stored irrigation signal, in association with respective times associated therewith, a location-specific crop-realizable water characteristic for the crop location, said location-specific crop-realizable water characteristic comprising a location-specific apparent evapotranspiration coefficient calculated using a generic evapotranspiration and one or more soil moisture values for the crop location, wherein said generic evapotranspiration is based on a generic reference crop;
    wherein said location-specific crop-realizable water characteristic characterizes water uptake availability for crops at the crop location for predicting a future crop-realizable water value at the crop location at least in part by determining location-specific evapotranspiration therefor using the location-specific apparent evapotranspiration coefficient corresponding to the crop location.

2. The system of claim 1, wherein said future crop-realizable water value at the crop location predicted by said location-specific crop-realizable water characteristic is further based on one or more water application events at the crop location.

3. The system of claim 1, wherein the digital data processor is operable to access a minimum available crop-realizable water value associated with the crop location.

4. The system of claim 1, wherein said digital data storage component is further configured to store environmental data and wherein said location-specific crop-realizable water characteristic calculation, at least in part, is further based on said environmental data.

5. The system of claim 4, wherein said environmental data is automatically acquired by at least one of: a precipitation sensor, a hygrometer, said network-interfacing sensor, a temperature sensor, a humidity sensor, a pressure sensor, a weather station, or a third-party data source.

6. The system of claim 1, wherein said location-specific crop-realizable water characteristic comprises one or more of a location-specific crop-realizable water growth characteristic for predicting an increase in future crop-realizable water values resulting from irrigation events, or a location-specific crop-realizable water decay characteristic for predicting a decrease in future crop-realizable water values between irrigation events.

7. The system of claim 1, wherein said digital data processor is further operable to calculate, at least in part based on said location-specific crop-realizable water characteristic, a location-specific irrigation application value so to provide a preferred crop application at the crop location to achieve a preferred future crop-realizable water value at the crop location.

8. The system of claim 7, wherein said digital data processor is further operable to calculate, at least in part based on said location-specific crop-realizable water characteristic, said location-specific irrigation application value so to provide said preferred crop application at the crop location to achieve said preferred future crop-realizable water value at the crop location accounting for one or more watering events.

9. The system of claim 7, wherein said preferred future crop-realizable water value is related to a threshold value or a target range of said future crop-realizable water value.

10. The system of claim 7, wherein said location-specific irrigation application value is calculated to provide said preferred future crop-realizable water value at the crop location for a designated duration of time.

11. The system of claim 7, wherein said digital data processor is further configured to output an irrigation control signal corresponding to said location-specific irrigation application value.

12. The system of claim 11, further comprising one or more irrigation deployment devices configured to apply a location-specific irrigation application in accordance with said location-specific irrigation application value in response to said irrigation control signal output from said digital data processor.

13. The system of claim 12, wherein said one or more irrigation deployment devices comprises one or more of a material distribution conduit, a distributed material reservoir, a vehicle-based material distributor, a drone, or a combination thereof.

14. The system of claim 1, wherein said digital data storage component is further configured to store crop outcome data in association with the crop location.

15. The system of claim 14, wherein at least some of said crop outcome data comprises observational crop data.

16. The system of claim 15, wherein at least some of said observational crop data comprises at least one of pre-harvest crop data and post-harvest crop data.

17. The system of claim 14, wherein said crop outcome data relates to one or more of a crop yield, a crop grade, or a crop damage.

18. The system of claim 1, wherein the crop location comprises the location of one or more of a farm, a field, a crop area, a portion of a field, a block, a portion of a block, a row of plants, a portion of a row of plants, a group of plants, or a plant.

19. The system of claim 1, wherein the digital data processor is in network communications with a display device, said display device configured to simultaneously display at least two of the following data: location-specific plant-realizable water value, location-specific sensor data from the network-interfacing sensors, and measured or derived data from corresponding location-specific soil characteristic sensors, wherein the displayed data correspond to the same crop location and the data is aligned according to time.

20. The system of claim 1, wherein said predicted future crop-realizable water value at the crop location at a given time in the future at least in part informs a location-specific irrigation application value to maintain said future crop-realizable water value at the crop location corresponding thereto in accordance with a desired parameter.

* * * * *